United States Patent
Yoshida

(10) Patent No.: US 6,281,987 B1
(45) Date of Patent: *Aug. 28, 2001

(54) COMMUNICATION APPARATUS

(75) Inventor: Takehiro Yoshida, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,010

(22) Filed: Mar. 12, 1998

(30) Foreign Application Priority Data

Mar. 12, 1997 (JP) .................................................. 9-076619
Apr. 24, 1997 (JP) .................................................. 9-121712
May 30, 1997 (JP) .................................................. 9-158148

(51) Int. Cl.$^7$ ............................... H04N 1/00; H04N 1/32
(52) U.S. Cl. ........................... 358/434; 358/442; 358/468
(58) Field of Search .................................... 358/434, 435, 358/436, 437, 440, 468, 442, 404, 400, 1.15, 405, 406; 379/100.01, 100.05, 100.06, 106.08

(56) References Cited

U.S. PATENT DOCUMENTS

| | | | |
|---|---|---|---|
| 3,742,452 | * | 6/1973 | Audretsch, Jr. et al. ............. 340/147 |
| 4,343,042 | * | 8/1982 | Schrock et al. ........................... 455/5 |
| 4,466,001 | * | 8/1984 | Moore et al. .................... 340/825.08 |
| 4,646,160 | * | 2/1987 | Iizuka .................................... 358/257 |
| 4,754,335 | * | 6/1988 | Izawa et al. .......................... 358/256 |
| 4,910,506 | | 3/1990 | Yoshida et al. .................. 340/825.07 |
| 5,084,770 | * | 1/1992 | Nakayama ............................ 358/403 |
| 5,239,576 | | 8/1993 | Yoshida et al. ...................... 379/355 |
| 5,457,689 | * | 10/1995 | Marvit et al. ........................ 370/85.8 |
| 5,563,883 | * | 10/1996 | Cheng ..................................... 370/73 |
| 5,583,658 | * | 12/1996 | Takezawa et al. ................... 358/440 |
| 5,644,407 | * | 7/1997 | Watanabe et al. ................... 358/434 |
| 5,671,270 | * | 9/1997 | Yoshida ............................... 379/100 |
| 5,684,607 | * | 11/1997 | Matsumoto .......................... 358/442 |
| 5,692,036 | * | 11/1997 | Saito ................................... 379/100 |
| 5,706,210 | * | 1/1998 | Kumano et al. ..................... 364/514 |
| 5,828,465 | * | 10/1998 | Muramatsu et al. ................. 358/400 |
| 5,847,842 | * | 12/1998 | Maeda ................................. 358/434 |
| 6,104,504 | * | 8/2000 | Imai et al. ........................... 358/407 |

\* cited by examiner

*Primary Examiner*—Madeleine Nguyen
(74) *Attorney, Agent, or Firm*—Fitzpatrick, Cella, Harper & Scinto

(57) ABSTRACT

There is provided a communication apparatus capable of carrying out communication for plural selective pollings in easy operations. When presence or absence of a function of plural selective pollings to be executed from a polling send station to a polling receive station is notified and communication for plural selective polling is selected by the polling receive station, plural selective pollings are executed in a communication event if the partner polling send station has the function of plural selective pollings, or the call is released each time communication of one selective polling is completed and the same destination is automatically called for the next selective polling if the partner polling send station does not have the function of plural selective pollings.

17 Claims, 39 Drawing Sheets

COMMUNICATION APPARATUS

BACKGROUND OF THE INVENTION

1. Field of the Invention

The present invention relates to a communication apparatus such as a facsimile apparatus capable of selective polling. It also relates to a communication apparatus such as a facsimile apparatus capable of performing communication using a sub-address signal.

2. Related Background Art

In conventional selective polling systems, a polling send station side declares presence of a function of selective polling to a polling receive station side, the polling receive station side transmits a DTC signal and an SEP signal, and the polling send station side performs polling transmission of information designated by the SEP signal.

However, such conventional systems cannot perform plural selective pollings.

In the case where plural selective pollings are required during one communication, an operator on the polling receive side cannot designate plural selective pollings unless confirming that the partner polling send station has a function for performing plural selective pollings during one communication. Such a selective polling system must be difficult to handle.

Further, in conventional facsimile apparatuses capable of performing communication using a sub-address signal, since it is not defined how to use the sub-address signal, facsimile transmission cannot be performed unless a user phones a partner user to determine how to use the sub-address signal before the facsimile transmission.

Thus, the user who intends confidential communication using the sub-address signal is required to phone an operator at a destination and obtain information associated with the sub-address signal for confidential transmission before setting the sub-address signal.

Although the sub-address signal can also be used for routing, the user is required in this case to phone a person at the destination as to what kind of apparatus is used at a terminal connected as a routed destination and how to designate the terminal, and thereafter set the sub-address signal.

As described above, the use of a sub-address signal always involves a phone call to the partner user, and it takes time very much.

At the partner side, it also takes a long time because an operator must receive an inquiry by phone each time sub-address communication is performed. This causes a great reduction in working efficiency.

According to the ITU-T recommendations T.30, sub-address communication is carried out by notifying to the partner station information associated with presence or absence of sub-address signal receiving capability by FIF (bit 49) of a DIS signal, and information associated with transmission of the sub-address signal by FIF (bit 49) of a DCS signal.

In this case, however, since only the information associated with the presence or absence of the sub-address signal receiving capability and information associated with the transmission of the sub-address signal are displayed, it is uncertain whether or not a sub-address signal different from the previous one can be sent from a transmitting apparatus when a communication mode is changed. In some conventional apparatuses, transmission of such a different sub-address signal may cause a communication error when the mode is changed, resulting in execution improper of communication.

SUMMARY OF THE INVENTION

It is an object of the present invention to provide a communication apparatus capable of performing plural selective pollings in easy operations.

It is another object of the present invention to provide a communication apparatus capable of smooth communication using a sub-address signal.

DETAILED DESCRIPTION OF THE PREFERRED EMBODIMENTS

First Embodiment

Figure 1:
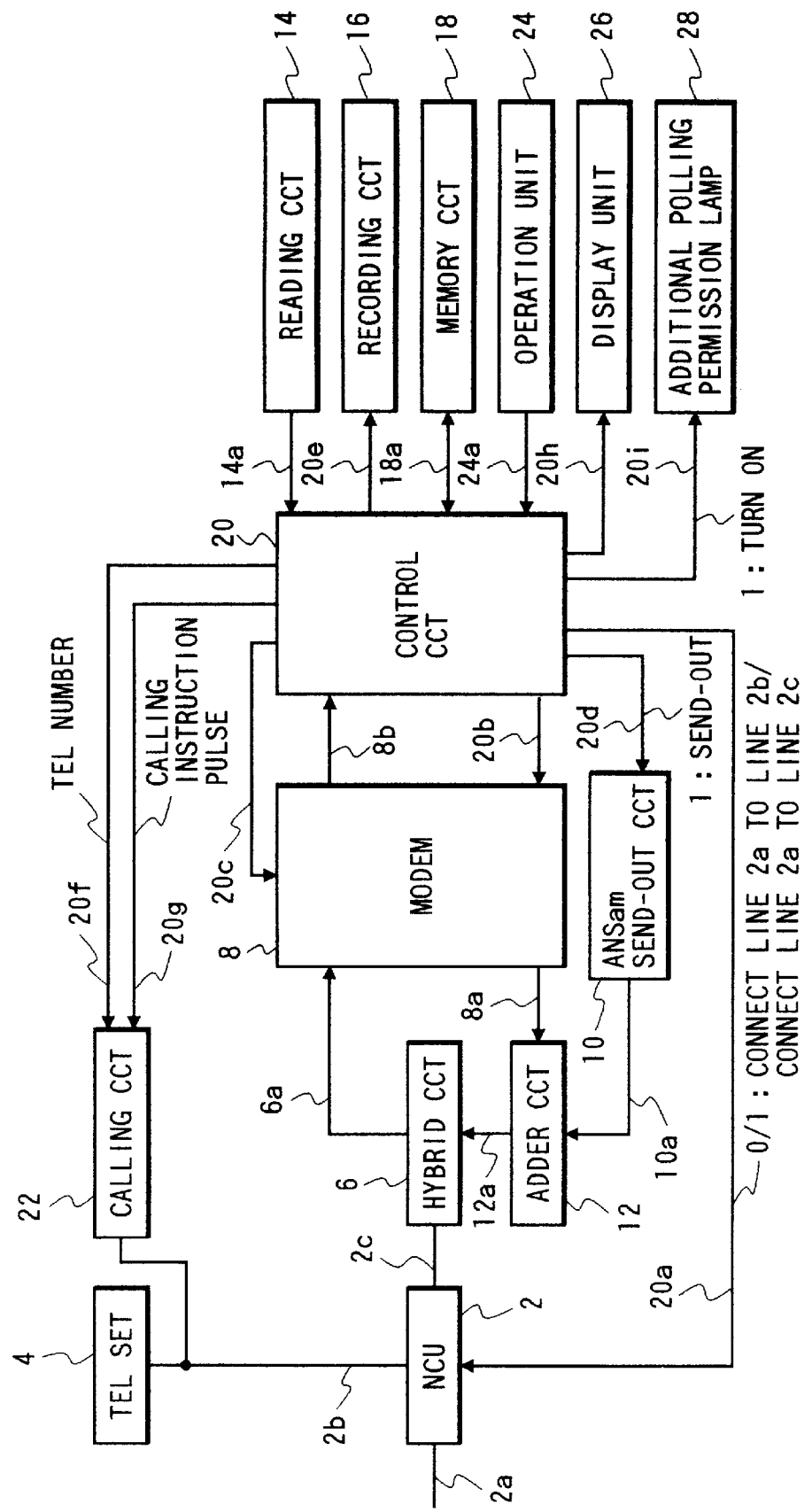
FIG. 1 is a block diagram showing a first embodiment of the present invention.

FIG. 1 is a block diagram showing a structure of a facsimile apparatus according to an embodiment of the present invention.

Referring to FIG. 1, an NCU (network control unit) 2 is connected to a terminal of a telephone line for data communication or the like over a telephone network in order to control connection with a telephone switching network, to make a switch to a data communication channel, and to hold a loop. The NCU 2 connects a telephone line 2a to the side of a telephone set when a signal level (signal line 20a) from a control circuit 20 is "0", and connects the telephone line 2a to the side of a facsimile apparatus when the signal level is "1". In normal state, the telephone line 2a is connected to the side of the telephone set 4.

A hybrid circuit 6 separates a signal of a sending system and that of a receiving system from each other and sends out a transmission signal from an adder circuit 12 to the telephone line 2a via the NCU 2, while it receives a signal from a partner station via the NCU 2 and sends it to a modem 8 via a signal line 6a.

The modem 8 performs modulation and demodulation according to the ITU-T recommendations V.8, V.21, V27ter, V.29, V.17 or V34, each transmission mode of which is designated by a signal line 20c. The modem 8 takes in a signal outputted to a signal line 20b and outputs modulated data to a signal line 8a, while it takes in a received signal outputted to the signal line 6a and outputs demodulated data to a signal line 8b.

An ANSam send-out circuit 10 is to send out an ANSam signal. The ANSam send-out circuit 10 is enabled to send out the ANSam signal to a signal line 10a when a signal with signal level "1" is outputted to a signal line 20d, and disabled to send out the ANSam signal when a signal with signal level "0" is outputted to the signal line 20d.

The adder circuit 12 takes in both information of the signal line 8a and information of the signal line 10a, and outputs an addition result to a signal line 12a. A reading circuit 14 reads an image on an original document and outputs read image data to a signal line 14a. A recording circuit 16 records information outputted to a signal line 20e one line by one line.

A memory circuit 18 is used to store unprocessed or coded information of the read data, and to store received information or decoded information.

A calling circuit 22 takes in telephone number information outputted to a signal line 20f when a calling instruction pulse is generated on a signal line 20g, and outputs a selection signal to the signal line 2b.

An operation unit 24 includes one-touch dialing keys, abbreviated dialing keys, a ten-key pad, */# keys, a polling text-number designate key, a set key, a start key and other function keys. When any one of keys is pressed, the operation unit 24 outputs information associated with a pressed key to a signal line 24a.

A display unit 26 may be an LCD which displays information outputted to a signal line 20h.

An indication lamp 28 is to indicate permission of additional polling after starting reception of polling. The lamp 28 turns on when a signal with signal level "1" is outputted to a signal line 20i, and turns off when a signal with signal level "0" is outputted to the signal line 20i.

In the embodiment, the control circuit 20 exercises control in order to notify presence or absence of a function to execute communication of plural selective pollings from a polling send station to a polling receive station.

In case communication of plural selective pollings is selected by the polling receiving side, the control circuit 20 executes control processing for plural selective pollings during the communication when the partner polling send station has the function of plural selective pollings. If the polling send station does not has such a function, the control circuit 20 automatically calls the same station each time one selective polling is completed, thus executing the next selective polling.

When the partner polling send station does not have the function of plural selective pollings, the control circuit 20 thus repeats automatic calling at times equal to the number of selective pollings instructed.

When the polling send station has the function of plural selective pollings, the control circuit 20 on the receiving side always requests execution of communication for plural selective pollings in order to enable plural selective pollings to be designated until the receiving station side terminates the communication.

FIGS. 2 to 6 are flowcharts showing a control flow of the control circuit 20 in the embodiment.

Figure 2:
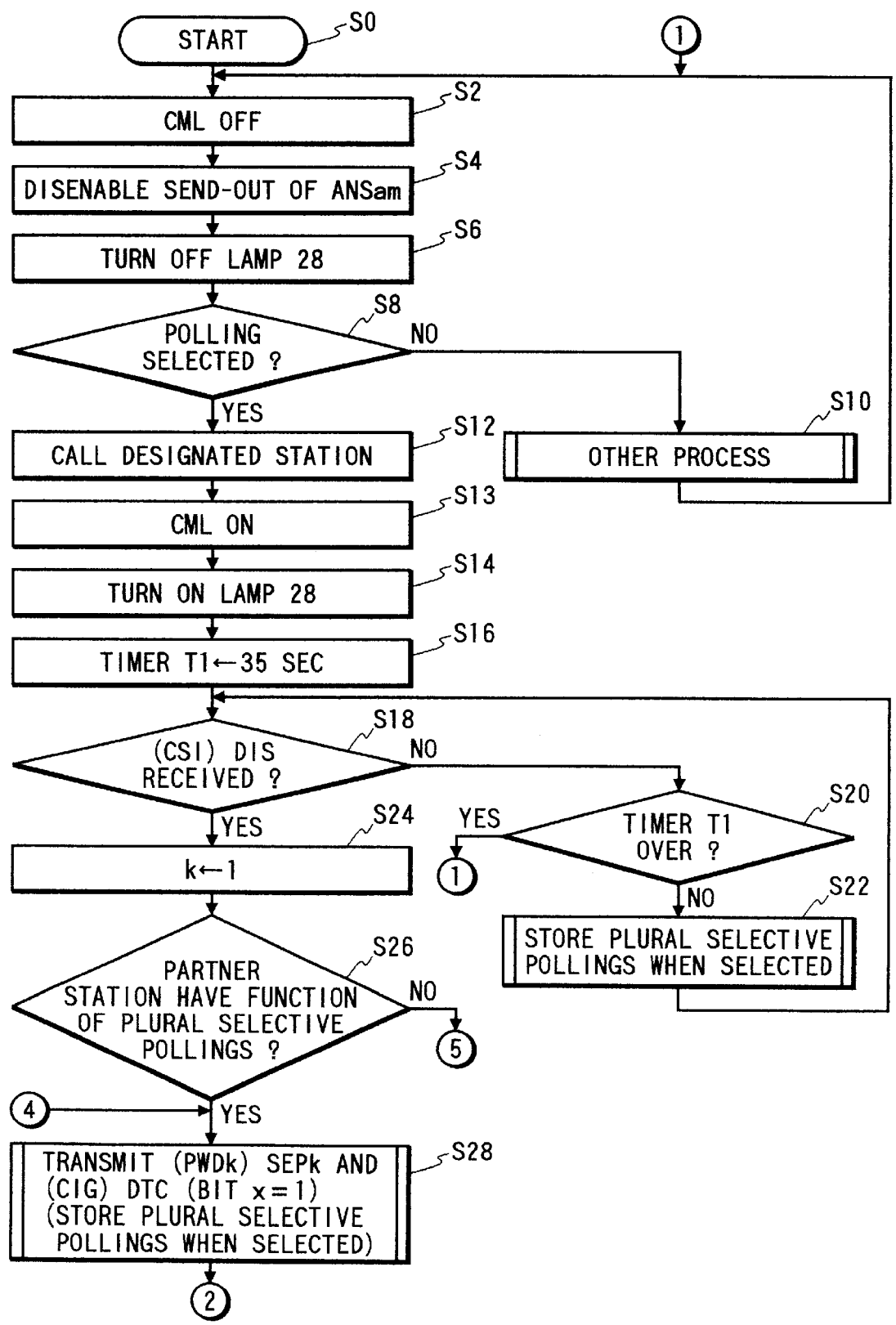
FIG. 2 is a flowchart showing operations of the first embodiment.
Figure 3:
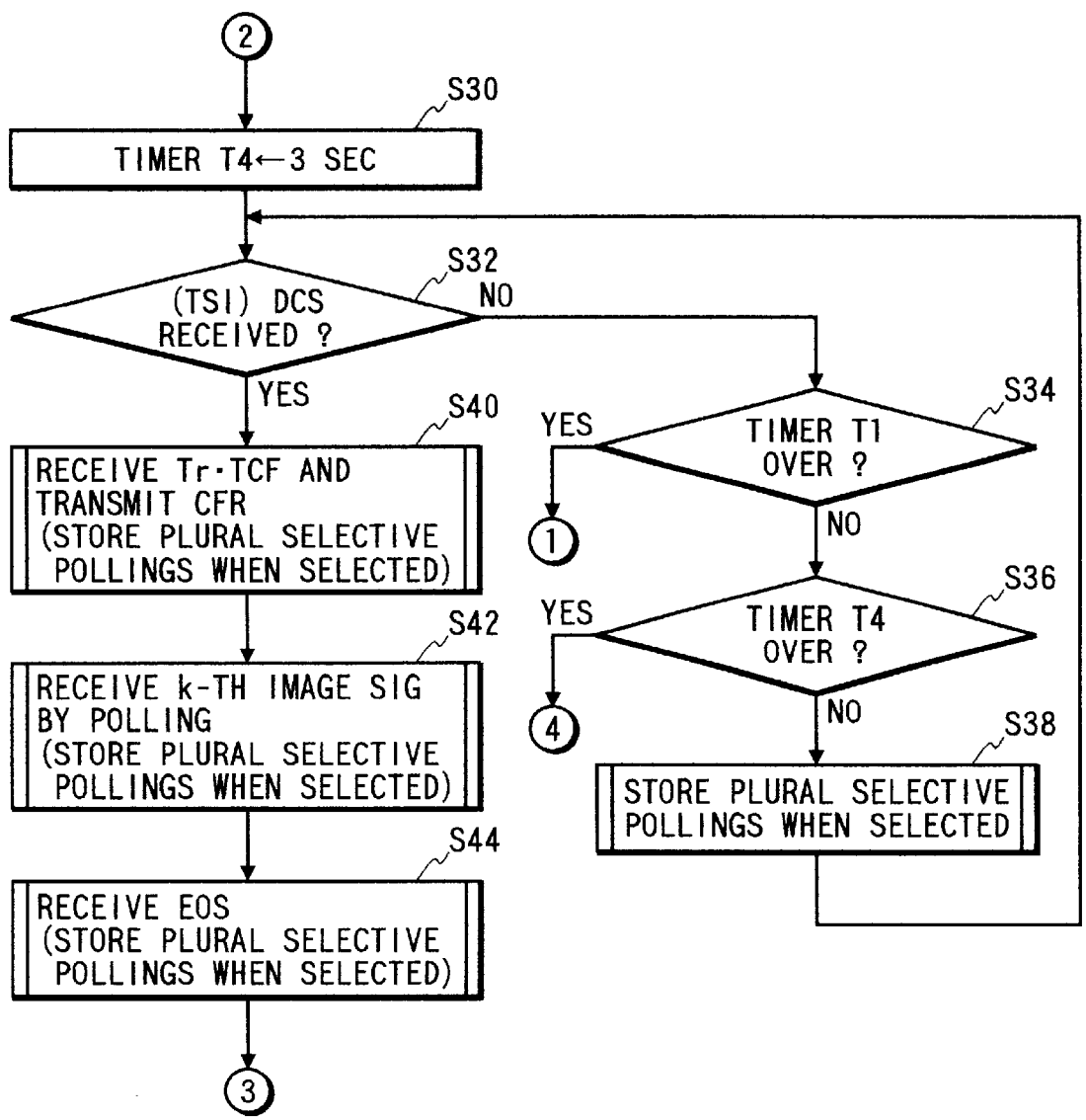
FIG. 3 is a flowchart showing operations of the first embodiment.
Figure 4:
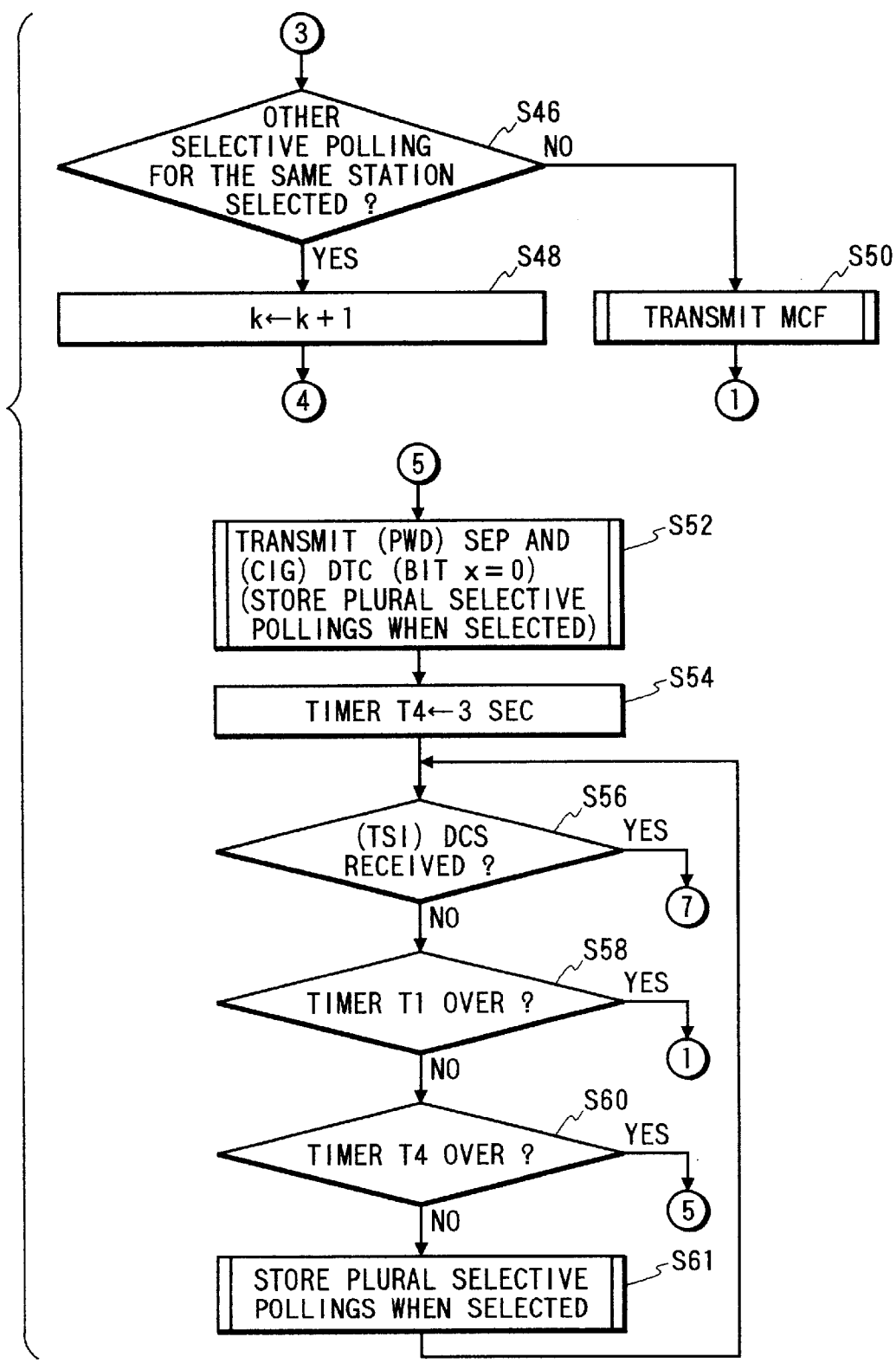
FIG. 4 is a flowchart showing operations of the first embodiment.
Figure 5:
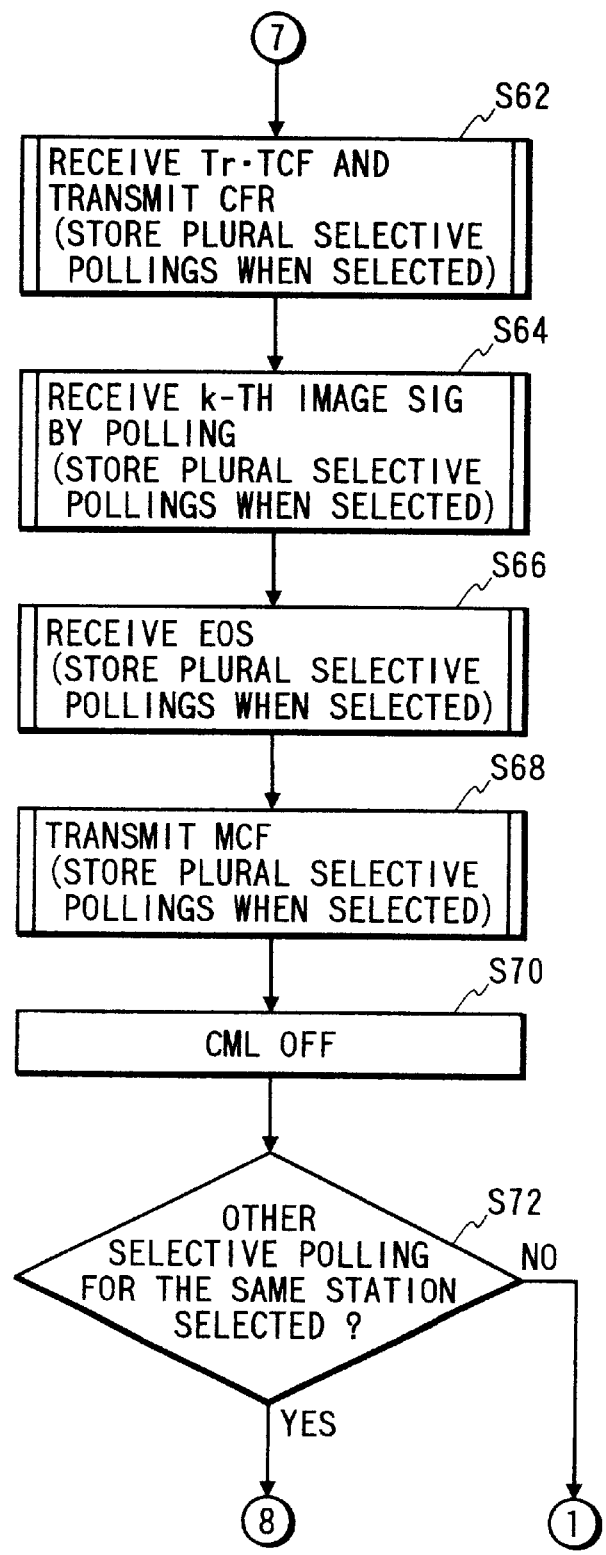
FIG. 5 is a flowchart showing operations of the first embodiment.
Figure 6:
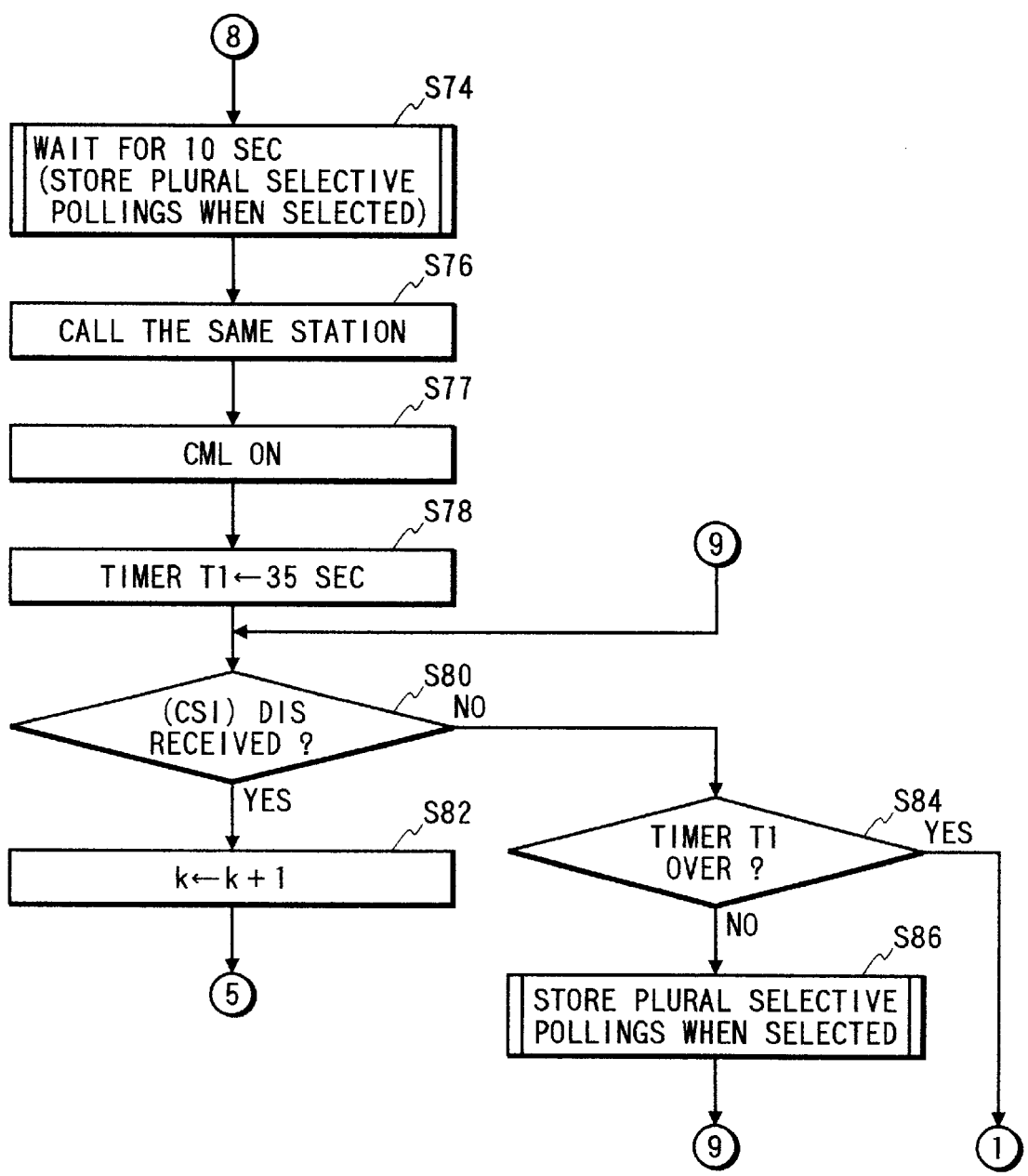
FIG. 6 is a flowchart showing operations of the first embodiment.

Referring to FIG. 2, control is started at step S0. In step S2, the control circuit 20 outputs a signal with signal level "0" to the signal line 20a to turn CML off. In step S4, it outputs a signal with signal level "0" to the signal line 20d to disable send-out of the ANSam signal. Further, in step S6, it outputs a signal with signal level "0" to the signal line 20i to turn off the additional polling permission lamp 28.

In the next step S8, the control circuit 20 takes in information of the signal line 24a to determine whether or not polling reception is selected. If not selected, it proceeds to step S10 and returns to step S2 after completion of other processes.

If polling reception is selected, it proceeds to step S12 to call a designated station through the calling circuit 22. In step S13, the control circuit 20 outputs a signal with signal level "1" to the signal line 20a to turn CML on.

In step S14, the control circuit 20 outputs a signal with signal level "1" to the signal line 20i to turn on the additional polling permission lamp 28. In step S16, it sets timer T1 to 35 seconds.

Next, in step S18, the control circuit 20 determines whether or not a (CIS)DIS signal has been received. It proceeds to step S20 if the (CIS)DIS signal has not been received, or to step S24 if received.

In step S20, the control circuit 20 determines whether or not timer T1 is over (timer T1 times out). It returns to step S2 if timer T1 is over (timer T1 times out), or proceeds to step S22 if not. In step S22, the control circuit 20 takes in information of the signal line 24a and stores plural selective pollings when they are selected.

Then, in step S24, the control circuit 20 sets 1 in a counter k for counting the number of selective pollings.

In the next step S26, the control circuit 20 determines from bit x of FIF of the DIS signal whether or not the polling send station has a function of communication for plural selective pollings. It proceeds to step S28 if the polling send station has this function, or step S52 if not.

In step S28, the control circuit 20 performs send-out of (PWDk)SEPk and (CIG)DTC signals, where k indicates a count of the counter k and bit x of FIF of the DTC signal is set to 1, to request plural selective pollings during one communication. Specifically, the polling send station requests transmission of an EOS (End of Selection) signal after completion of transmission of one information designated by the SEP signal. Here, the control circuit 20 stores plural selective pollings when selected.

Next, in step S30, the control circuit 20 sets timer T4 to 3 seconds. In step S32, the control circuit 20 determines whether or not a (TSI)DCS signal has been received. It proceeds to step S40 if the (TSI)DCS signal has been received, or to step S34 if not.

In step S34, the control circuit 20 determines whether or not timer T1 is over. It returns to step S2 if timer T1 is over, or proceeds to step S36 if not.

In step S36, the control circuit 20 determines whether or not timer T4 is over. It returns to step S28 if timer T4 is over, or proceeds to step S38 if not. Here, the control circuit 20 stores plural selective pollings when selected.

In step S40, the control circuit 20 receives Tr•TCF signals and transmits a CFR signal. Here, it also stores plural selective pollings when selected.

Next, in step S42, the control circuit 20 receives a k-th image signal by polling. Here, it also stores plural selective pollings when selected.

In step S44, the control circuit 20 receives the EOS signal. Here, it also stores plural selective pollings when selected.

Next, in step S46, the control circuit 20 determines whether or not other selective polling reception for the same station has been selected. If selected and the selective polling is to be executed, the control circuit 20 proceeds to step S48 to increment the counter K by 1 and returns to step S28. If not selected, the control circuit 20 proceeds to step S50 to perform transmission of the MCF signal and returns to step S2.

In step S52, the control circuit 20 transmits (PWD)SEP and (CIG)DTC signals. Here, it sets bit x of FIF of the DTC signal to 0 to notify that plural selective pollings during one communication are not requested. Specifically, the polling send station transmits the EOP signal without requesting transmission of the EOS signal after completion of transmission of one information designated by the SEP signal. Here, the control circuit 20 also stores plural selective pollings when selected.

Next, in step S54, the control circuit 20 sets timer T4 to 3 seconds. In step S56, it determines whether or not the (TSI)DCS signal has been received. It proceeds to step S62 if the (TSI)DCS signal has been received, or to step S58 if not.

In step S58, the control circuit 20 determines whether or not timer T1 is over. It returns to step S2 if timer T1 is over, or proceeds to step S60 if not.

In step S60, the control circuit 20 determines whether or not timer T4 is over. It returns to step S52 if timer T4 is over, or proceeds to step S61 if not to store plural selective pollings when selected.

In step S62, the control circuit 20 receives the Tr•TCF signals and transmits the CFR signal. Here, it also stores plural selective pollings when selected. Next, in step S64, it receives the k-th image signal by polling and stores plural selective pollings when selected.

In step S66, the control circuit 20 receives the EOP signal and stores plural selective pollings when selected. Next, in step S68, the control circuit 20 transmits the MCF signal. Here, it also stores plural selective pollings when selected.

Next, in step S70, the control circuit 20 outputs a signal with signal level "0" to the signal line 20a to turn CML off. In step S72, it determines whether or not other selective polling reception for the same station has been selected. If selected and the selective polling is to be executed, the control circuit 20 proceeds to step S74. If not selected, it returns to step S2.

In step S74, the control circuit 20 waits for 10 seconds. Here, it also stores plural selective pollings when selected.

Next, in step S76, the control circuit 20 calls the same station through the calling circuit 22. In step S77, it outputs a signal with signal level "1" to the signal line 20a to turn CML on. In step S78, it sets timer T1 to 35 seconds.

In step S80, the control circuit 20 determines whether or not the (CSI)DIS signal has been received. If the (CSI)DIS signal has been received, the control circuit 20 proceeds to step S82 to increment the counter k by 1 and returns to step S52.

If the (CSI)DIS signal has not been received, the control circuit 20 proceeds to step S84 to determine whether or not timer T1 is over. Then it returns to step S2 if timer T1 is over, or proceeds to step S86 if not. In step S86, the control circuit 20 stores plural selective pollings when selected.

Thus the communication of plural selective pollings can be realized by the above easy operations. Although the above embodiment has been described by taking a stand-alone facsimile apparatus by way of example, the present invention is not limited thereby and such a facsimile capability can be applied to other apparatus combined with a copying machine or data communication capability. The function of the present invention can also be used for data communication.

As described above, according to the first embodiment, a user on the polling receiving side is allowed to perform plural selective pollings without being aware of whether or not the partner station has the function of plural selective pollings. It is therefore possible to achieve simplification of operations, and hence to improve ease of handling the apparatus.

According to the first embodiment, the user on the polling receiving side is also allowed to additionally perform polling reception of other information from the same station after starting polling reception, thereby improving ease of handling the apparatus.

Second Embodiment

In the first embodiment, the SEP signal is transmitted plural times during one communication so that plural texts can be received by polling.

The polling send side uses the DIS signal to designate the presence or absence of the function of plural selective pollings, while the polling receive side uses the DTC signal to designate whether or not plural selective pollings are requested. When plural selective pollings are selected, the polling send side transmits the EOS (End of Selection) signal instead of the EOP signal after completion of polling transmission of data designated by the SEP signal. Here, the polling receive station can designate other polling.

However, in this case, when the partner transmit station is not available for plural selective pollings, only the first selected text is received by polling even if reception of the plural selective pollings is selected after calling.

It is therefore an object of the second embodiment to provide a communication apparatus capable of smooth communication of plural selective pollings with various types of partner stations.

Figure 7:
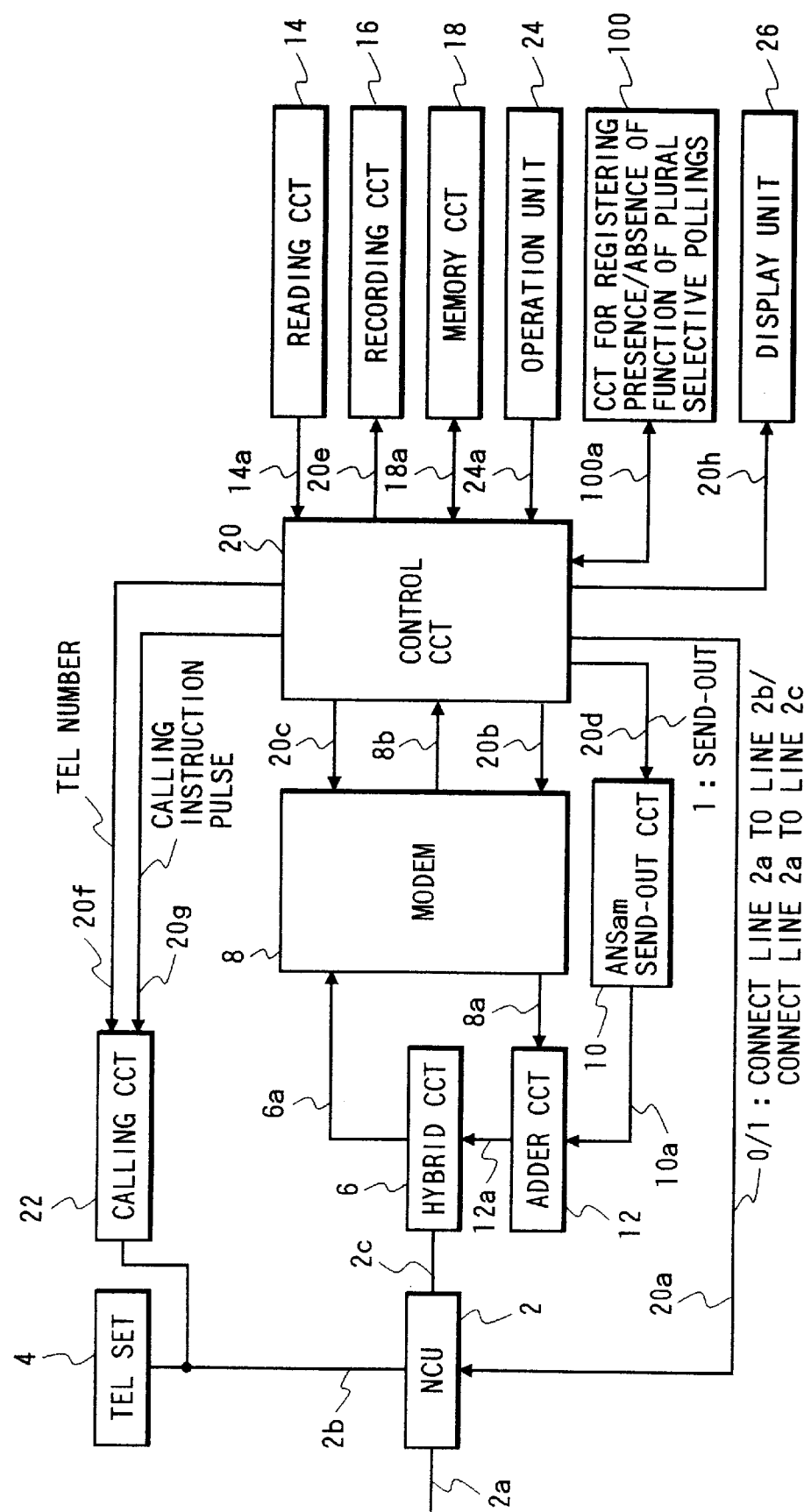
FIG. 7 is a block diagram showing a second embodiment of the present invention.

FIG. 7 is a block diagram showing a structure of a facsimile apparatus according to a second embodiment of the present invention.

In FIG. 7, portions common to those in FIG. 1 are given the same reference numbers, and description thereof is omitted.

A registration circuit 100 is to register through a signal line 100a whether or not the function of plural selective pollings is available at each calling destination assigned to a corresponding one-touch dialing key or abbreviated dialing key.

The display unit 26 indicates that when reception of plural selective pollings is selected, a partner polling send station does not have such a function. In this case, the display unit 26 also displays all the selective pollings set here so that the user can perform an easy key operation to select one selective polling therefrom.

In the second embodiment, when communication of plural selective pollings is selected and a called station is designated, if the communication of plural selective pollings is available on the called station side, the control circuit 20 starts dialing immediately. On the other hand, if the communication of plural selective pollings is impossible on the called station side, it makes a display on the display unit 26 to indicate that communication of plural selective pollings is impossible and a display of all the selective pollings inputted. When one of selective pollings is selected from the displayed ones and starting of polling reception is designated, the control circuit 20 enters a dialing control process. Further, the control circuit 20 executes control processing for updating information registered in the registration circuit 100, as to whether or not communication of plural selective pollings is possible at each calling destination, each time an initial identification signal is received during communication.

FIGS. 8 to 11 are flowcharts showing a control flow of the control circuit 20 in the second embodiment.

Figure 8:
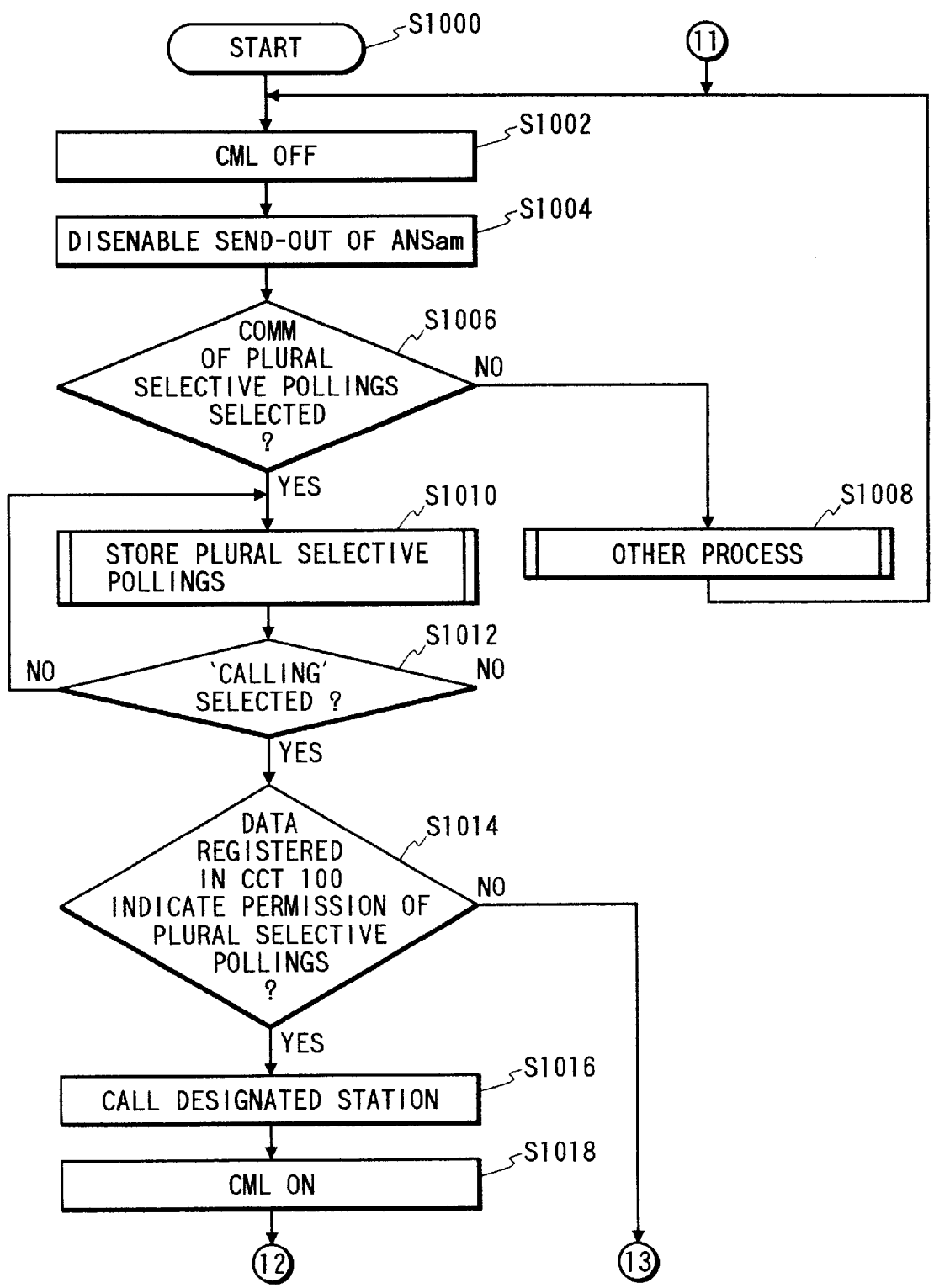
FIG. 8 is a flowchart showing operations of the second embodiment.
Figure 9:
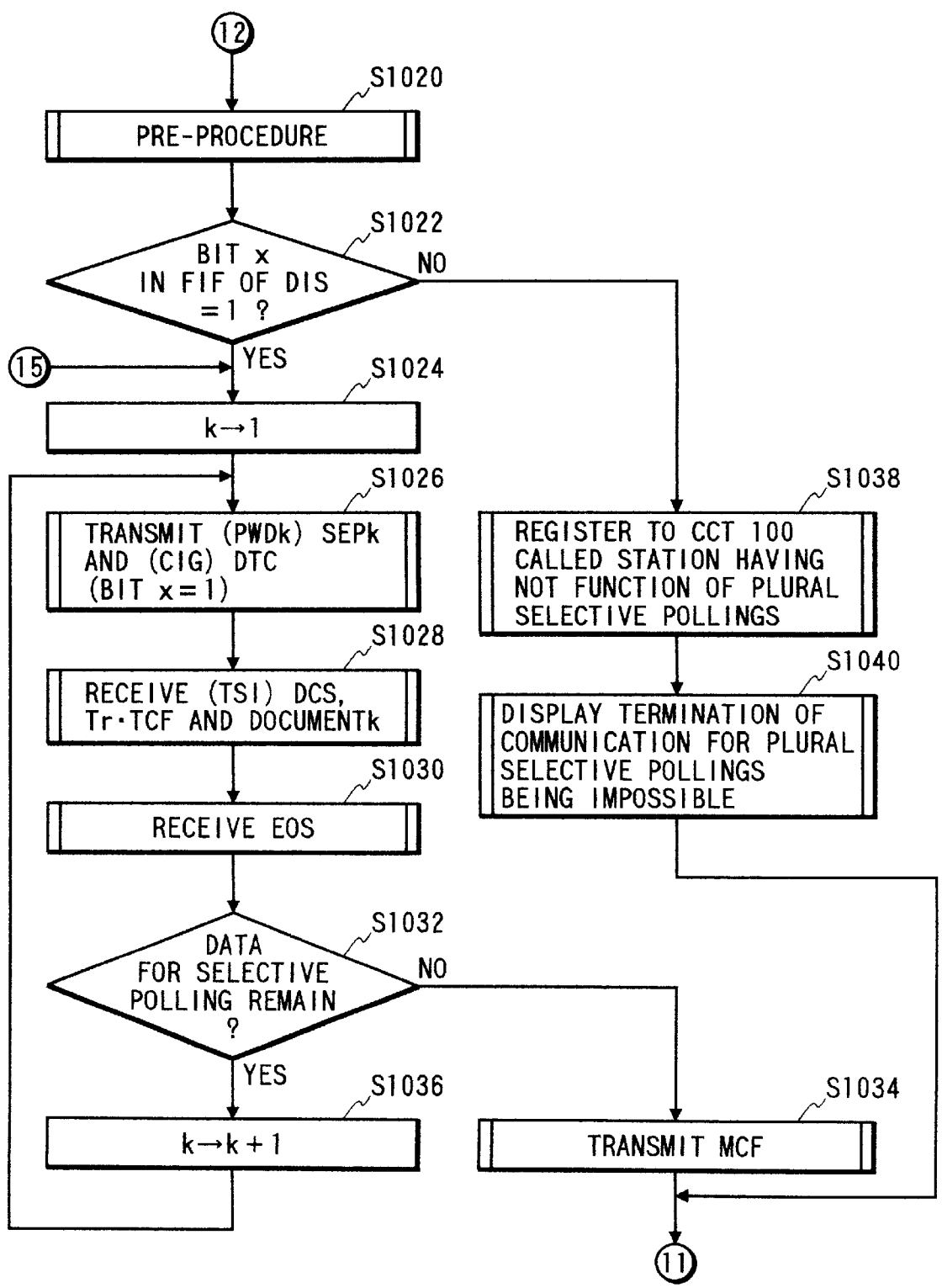
FIG. 9 is a flowchart showing operations of the second embodiment.
Figure 10:
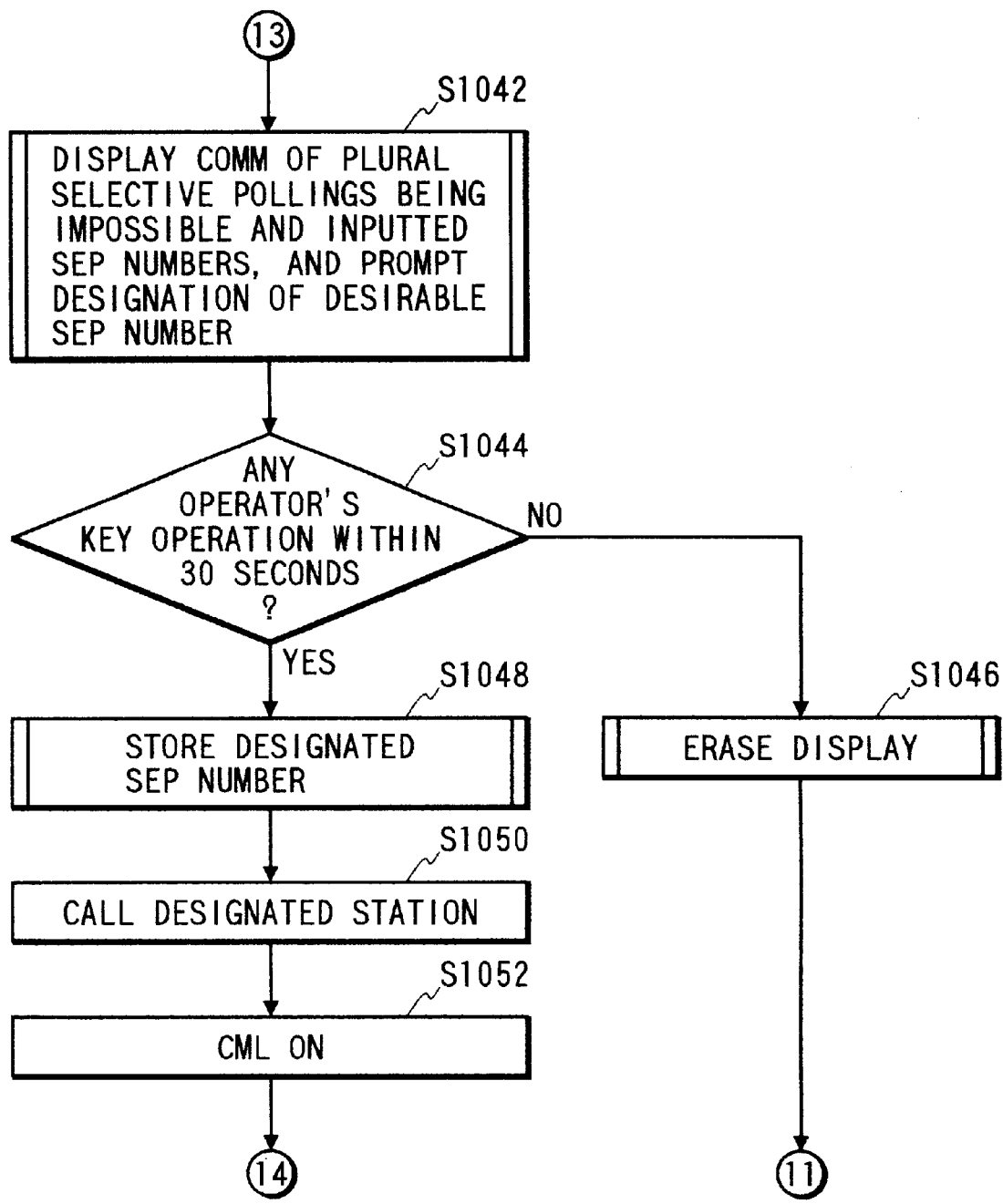
FIG. 10 is a flowchart showing operations of the second embodiment.
Figure 11:
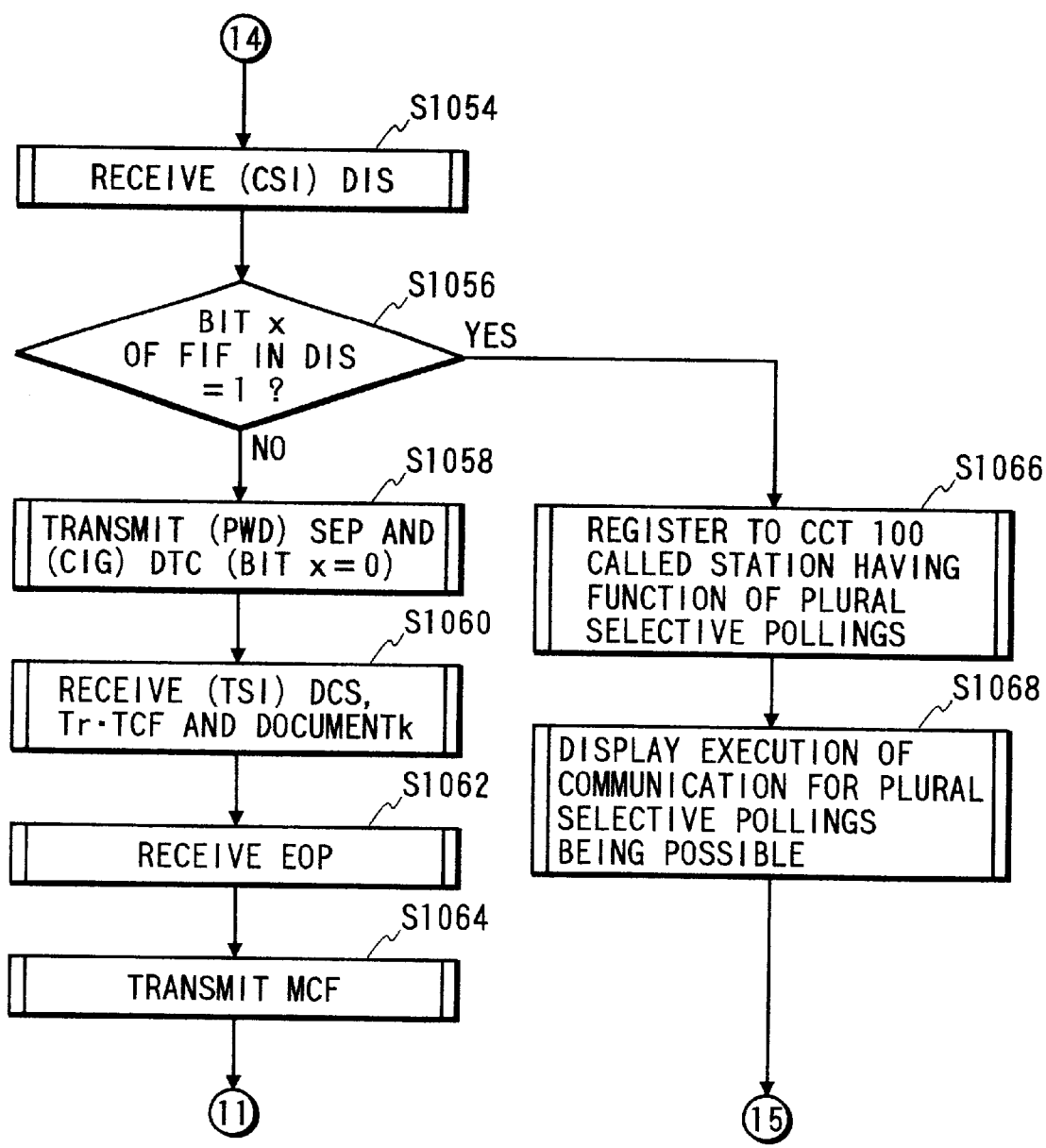
FIG. 11 is a flowchart showing operations of the second embodiment.

Referring to FIG. 8, control is started at step S1000. In step S1002, the control circuit 20 outputs a signal with signal level "0" to the signal line 20a to turn CML off. In step S1004, it outputs a signal with signal level "0" to the signal line 20d to disable send-out of the ANSam signal.

In step S1006, the control circuit 20 takes in information of the signal line 24a to determine whether or not reception of plural selective pollings has been selected. If selected, it proceeds to step S1010 to store designation of reception of plural selective pollings. If not selected, it proceeds to step S1008 to perform other processes.

In step S1012, the control circuit 20 takes in information of the signal line 24a to determine whether or not calling has been selected. It proceeds to step S1014 if calling has been selected, or to step S1010 if not. In step S1014, the control circuit 20 takes in information of the signal line 100a to determine from the information registered in the registration circuit 100 whether or not reception of plural selective pollings is possible at the calling destination. It proceeds to step S1016 if reception is possible, or to step S1042 if not.

In step S1016, the control circuit 20 starts calling the designated destination through the calling circuit 28. In step S1018, it outputs a signal with signal level "1" to the signal line 20a to turn CML on. In step S1020, it performs remaining pre-procedure including reception of the (CSI) DIS signal.

In step S1022, the control circuit 20 determines whether or not bit x of FIF of the DIS signal is 1. It proceeds to step S1024 if it is 1 and indicates that transmission of plural selective pollings is possible on the polling send station side, or to step S1038 because transmission of plural selective pollings is impossible.

In step S1024, the control circuit 20 sets 1 in the counter k. In step S1026, it transmits the (PWDk)SEPk and (CIG) DTC signals, where k is set to a positive integer (1, 2, 3, . . . ). Here, the control circuit 20 sets bit x of FIF of the DTC signal to 1. Then, it requests transmission of the EOS (End of Selection) signal after requesting the polling send station side to execute transmission of plural selective pollings, i.e., after transmission of one text.

In step S1028, the control circuit 20 receives the (TSI) DCS, Tr•TCF and DOCUMENT signals. In step S1030, it receives the EOS signal. Then, in step S1032, the control circuit 20 determines whether information to be received by polling is present or absent. If information is absent, it proceeds to step S1034 to transmit the MCF signal and returns to step S1002. If present, it proceeds to step S1036 to increment the counter k by 1 and returns to step S1026.

In step S1038, the control circuit 20 registers to the registration circuit 100 through the signal line 100a that the destination presently called does not have the function of plural selective pollings. In step S1040, it displays, on the display unit 26 through the signal line 20h, that the communication is terminated because multi-polling reception is impossible. This display is erased by pressing any key.

In step S1042, the control circuit 20 displays, on the display unit 26 through the signal line 20h, that communication of multi-polling is impossible at the destination, and display SEP numbers to prompt the operator to designate a desirable one.

In step S1044, the control circuit 20 takes in information of the signal line 22a to determine whether or not the operator's key operation has occurred within 30 seconds. It proceeds to step S1048 if the key operation has occurred within 30 seconds, or to step S1046 if not to erase the display from the display unit 26 through the signal line 20h.

In step S1048, the control circuit 20 stores the SEP number designated from the operation unit 24 through the signal line 24a. In step S1050, it calls the designated destination through the calling circuit 22. In step S1052, it outputs a signal with signal level "1" to the signal line 20a to turn CML on. In step S1054, it receives the (CSI)DIS signal.

Then, in step S1056, the control circuit 20 determines whether bit x of FIF of the DIS signal is 1, i.e., whether or not the polling send station side has the function of plural selective pollings. It proceeds to step S1066 if bit x of FIF of the DIS signal is 1, i.e., the polling send station side has the function of plural selective pollings, or to step S1058 if bit x of FIF of the DIS signal is 0, i.e., the polling send station side does not have the function of plural selective pollings.

In step S1058, the control circuit 20 transmits the (PWD) SEP and (CIG)DTC signals. Here, it sets bit x of FIF of the DTC signal to 0 to indicate that transmission of plural selective pollings are not requested.

The control circuit 20 receives the (TSI)DCS, Tr•TCF and DOCUMENT signals in step S1060, the EOP signal in step S1062, and transmits the MCF signal in step S1064.

In step S1066, the control circuit 20 registers to the registration circuit 100 through the signal line 100a that the destination presently called has the function of plural selective pollings. In step S1068, it displays, on the display unit 26 through the signal line 20h, that the communication is executed because communication of plural selective pollings is available at the destination presently called. This display is erased by any operator's key operation.

Third Embodiment

A third embodiment will next be described.

In the embodiment, when communication of plural selective pollings is selected after calling, presence or absence of communication for plural selective pollings is determined by presence/absence information associated with communication of plural selective pollings based on an initial identification signal after received, while it is determined by presence/absence information associated with communication of plural selective pollings based on information registered in the registration circuit 100 before the initial identification signal is received. As a result of the determination, if the communication of plural selective pollings is possible, plural selective pollings are executed communication. On the other hand, if the communication of plural selective pollings is impossible, the second and subsequent pollings are not executed and it is displayed.

Figure 12:
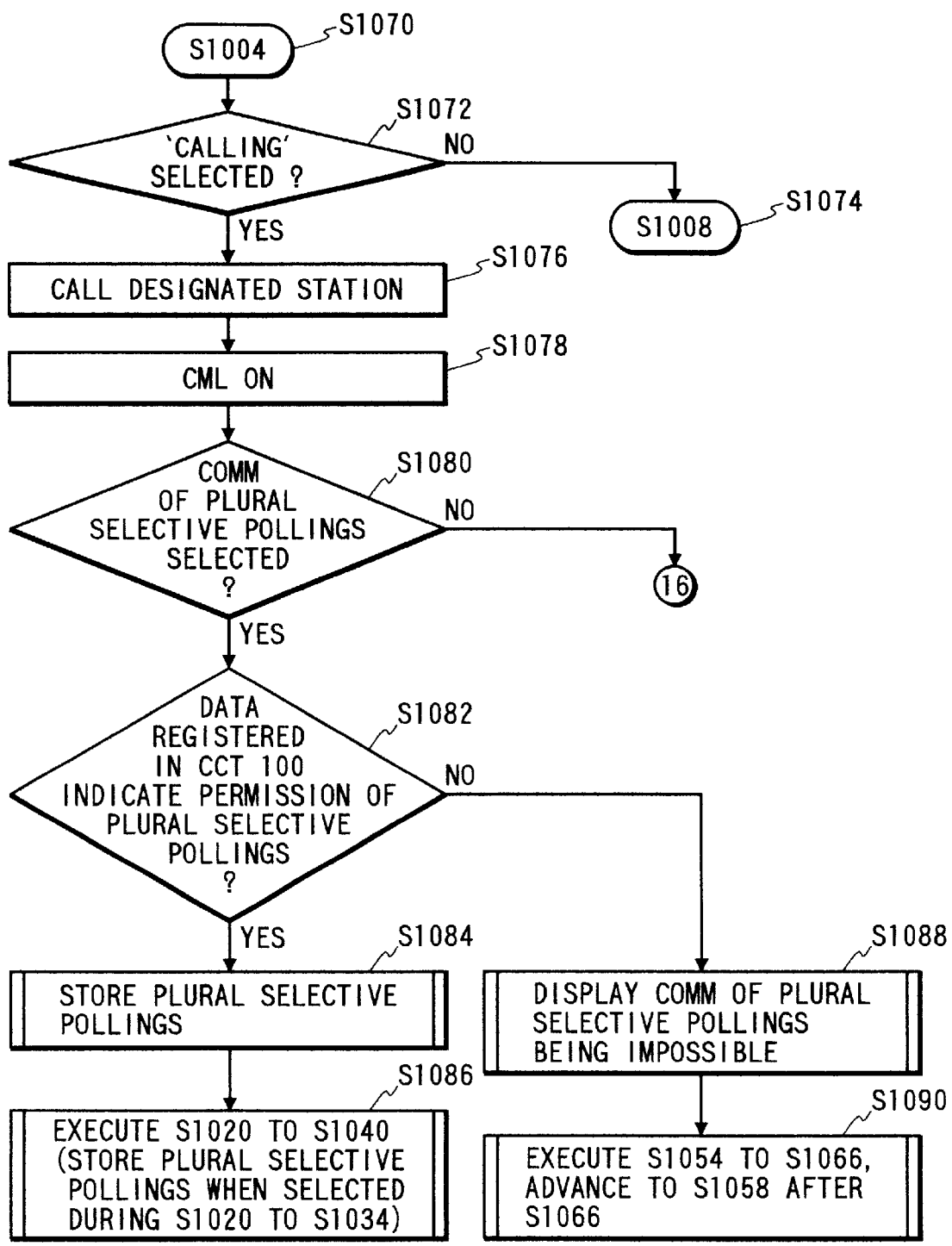
FIG. 12 is a flowchart showing operations of the second embodiment.
Figure 13:
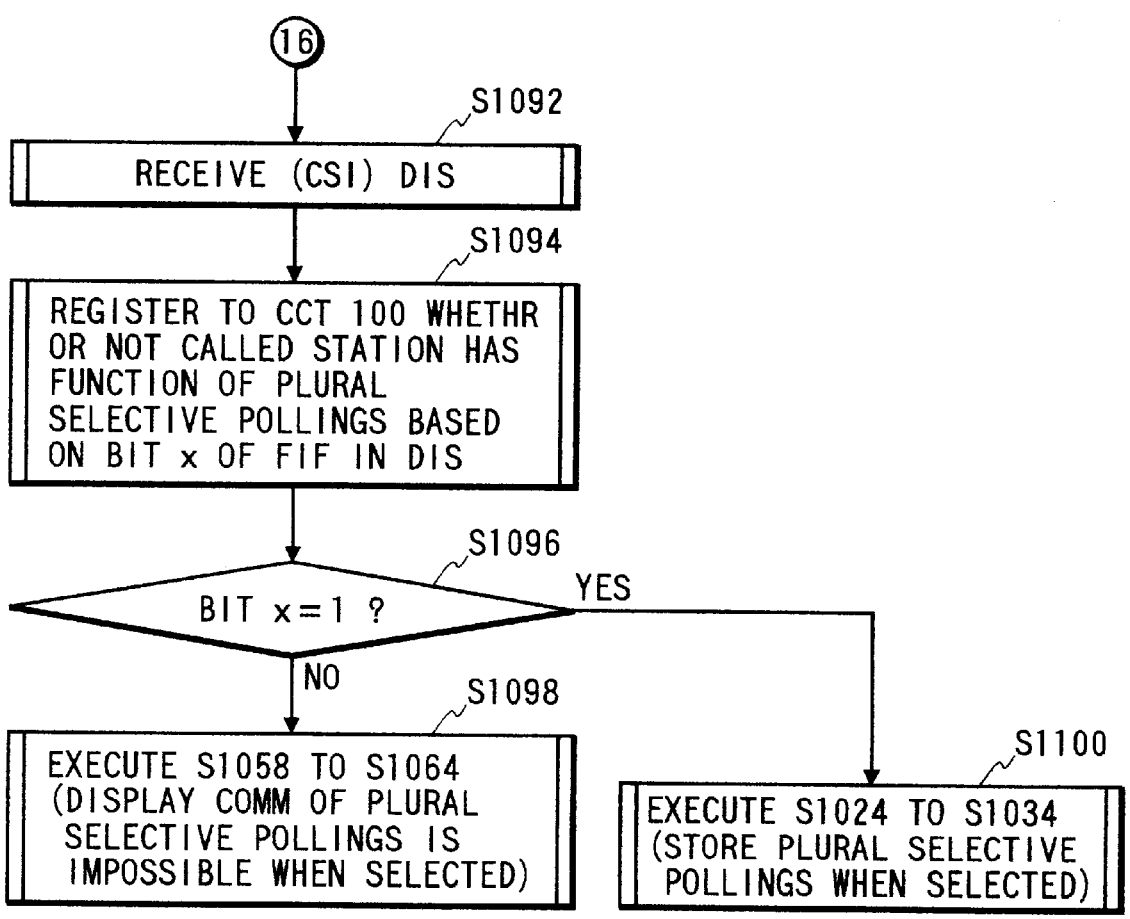
FIG. 13 is a flowchart showing operations of a third embodiment of the present invention.

FIG. 12 is a flowchart showing portions of control operations in the third embodiment different from those in the second embodiment.

Referring to FIG. 12, step S1070 represents step S1004 described above. Then, in step S1072, the control circuit 20 takes in information of the signal line 24a to determine whether or not calling has been selected. It proceeds to step S1076 if calling has been selected, or to step S1074 (corresponding to step S1008) if not.

In step S1076, the control circuit 20 calls a designated station through the calling circuit 22. In step S1078, it outputs a signal with signal level "1" to the signal line 20a to turn CML on.

In step S1080, the control circuit 20 takes in information of the signal line 22a to determine whether or not reception of plural selective pollings has been selected. It proceeds to step S1082 if reception of plural selective pollings has been selected, or to step S1092 if not.

In step S1082, the control circuit 20 takes in information stored in the registration circuit 100 through the signal line 100a to determine whether or not reception of plural selective pollings is possible. It proceeds to step S1084 if reception is possible, or to step S1088 if not.

In step S1084, the control circuit 20 takes in information of the signal line 24a to store designation of reception of plural selective pollings. In step S1086, it executes steps S1020 to S1040 described above. Here, it stores plural selective pollings when selected by the operator in steps S1020 to S1034.

In step S1088, the control circuit 20 displays, on the display unit 26 through the signal line 20h, that communication of plural selective pollings is impossible. This display is erased by pressing any key. Next, step S1090 represents execution of steps S1054 to S1066 described above. Here, it proceeds to step S1058 after execution of step S1066.

In step S1092, the control circuit 20 receives the (CSI)DIS signal. In step S1094, it registers to the registration circuit 100 whether or not the station presently called has the function of plural selective pollings based on bit x of FIF of the DIS signal. Here, it registers the presence of the function if bit x of FIF of the DIS signal is 1, and the absence of the function if bit x of FIF of the DIS signal is 0.

In step S1096, the control circuit 20 determines whether or not bit x of FIF of the DIS signal is 1, i.e., whether or not the partner polling send station has the function of plural selective pollings. It proceeds to step S1100 if bit x of FIF of the DIS signal is 1, i.e., the partner station has the function of plural selective pollings, or to step S1098 if bit x of FIF of the DIS signal is 0, i.e., the partner station does not has the function of plural selective pollings.

In step S1098, the control circuit 20 executes steps S1058 to S1064 described above. Here, it takes in information of the signal line 24a to display on the display unit 26 through the signal line 20h that reception of plural selective pollings is impossible when selected. This display is erased by pressing any key.

In step S1100, the control circuit 20 executes steps S1024 to S1034 described above. Here, it takes in information of the signal line 24a to store multi-polling reception when selected by the operator.

Fourth Embodiment

Figure 14:
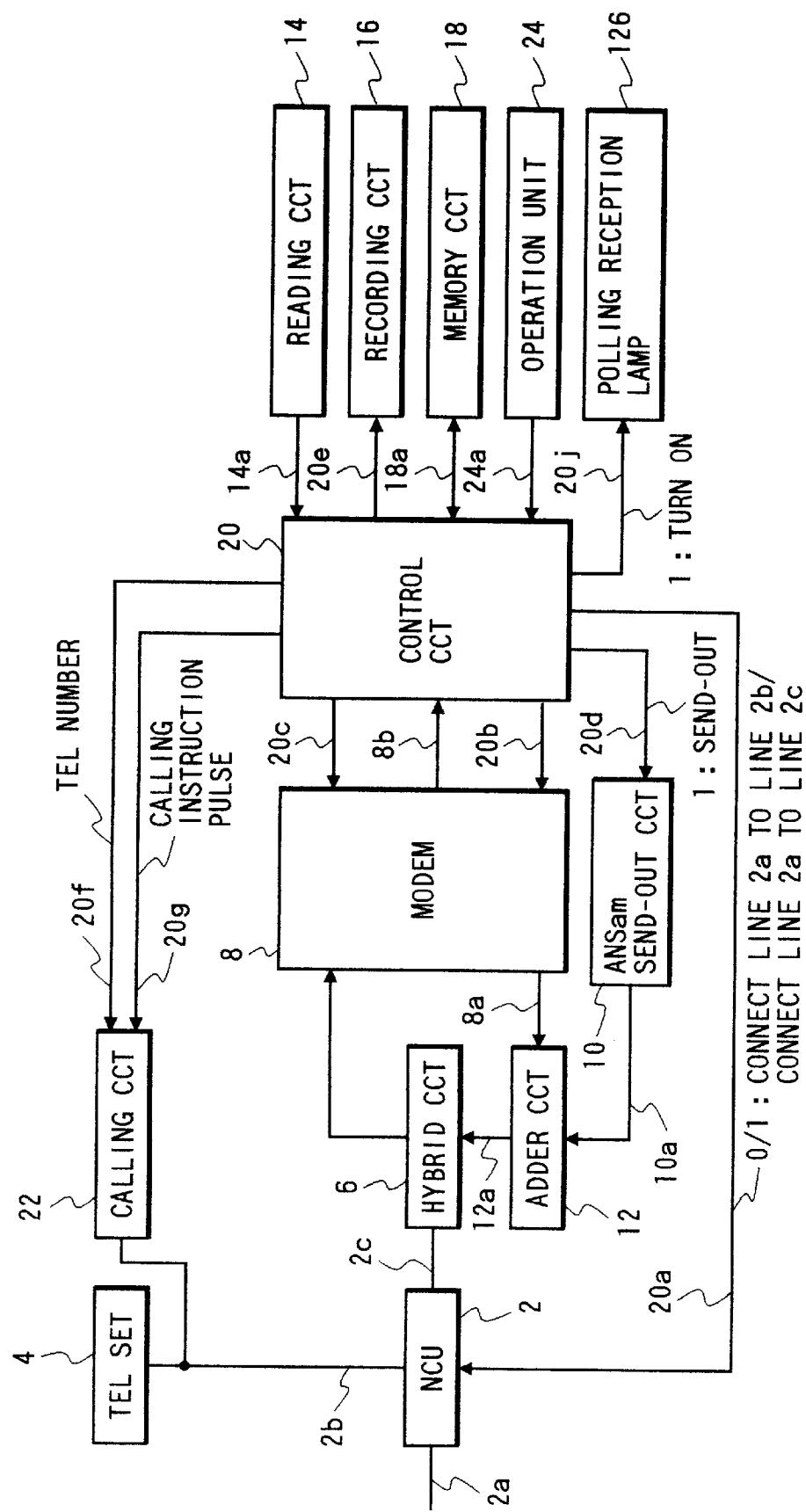
FIG. 14 is a block diagram showing a fourth embodiment of the present invention.

FIG. 14 is a block diagram showing a structure of a facsimile apparatus according to a fourth embodiment of the present invention.

In the fourth embodiment, portions common to those in the first embodiment are given the same reference numbers, and description thereof is omitted.

A lamp 126 is to indicate that input of a further SEP signal is accepted during one communication. The lamp turns on when a signal with signal level "1" is outputted to a signal line 20j, and turns off when a signal with signal level "0" is outputted to the signal line 20j.

In the fourth embodiment, the control circuit 20 performs control processing for changing a notification of whether the polling receive station requests reception of plural selective pollings in a timer polling mode (timer polling reception) or a real-time polling mode (real-time polling reception).

Specifically, in the timer polling mode, when one selective polling is selected on the polling receive side, communication of plural selective pollings is not requested to the polling send station side. On the other hand, when plural selective pollings are selected, communication of plural selective pollings is requested to the polling send station side.

In the real-time polling mode, communication of plural selective pollings is requested to the polling send station side in both a case where one selective polling is selected on the polling receive station side and a case where plural selective pollings are selected on the polling receive station side.

FIGS. 15 to 18 are flowcharts showing a control flow of the control circuit 20 in the fourth embodiment.

Figure 15:
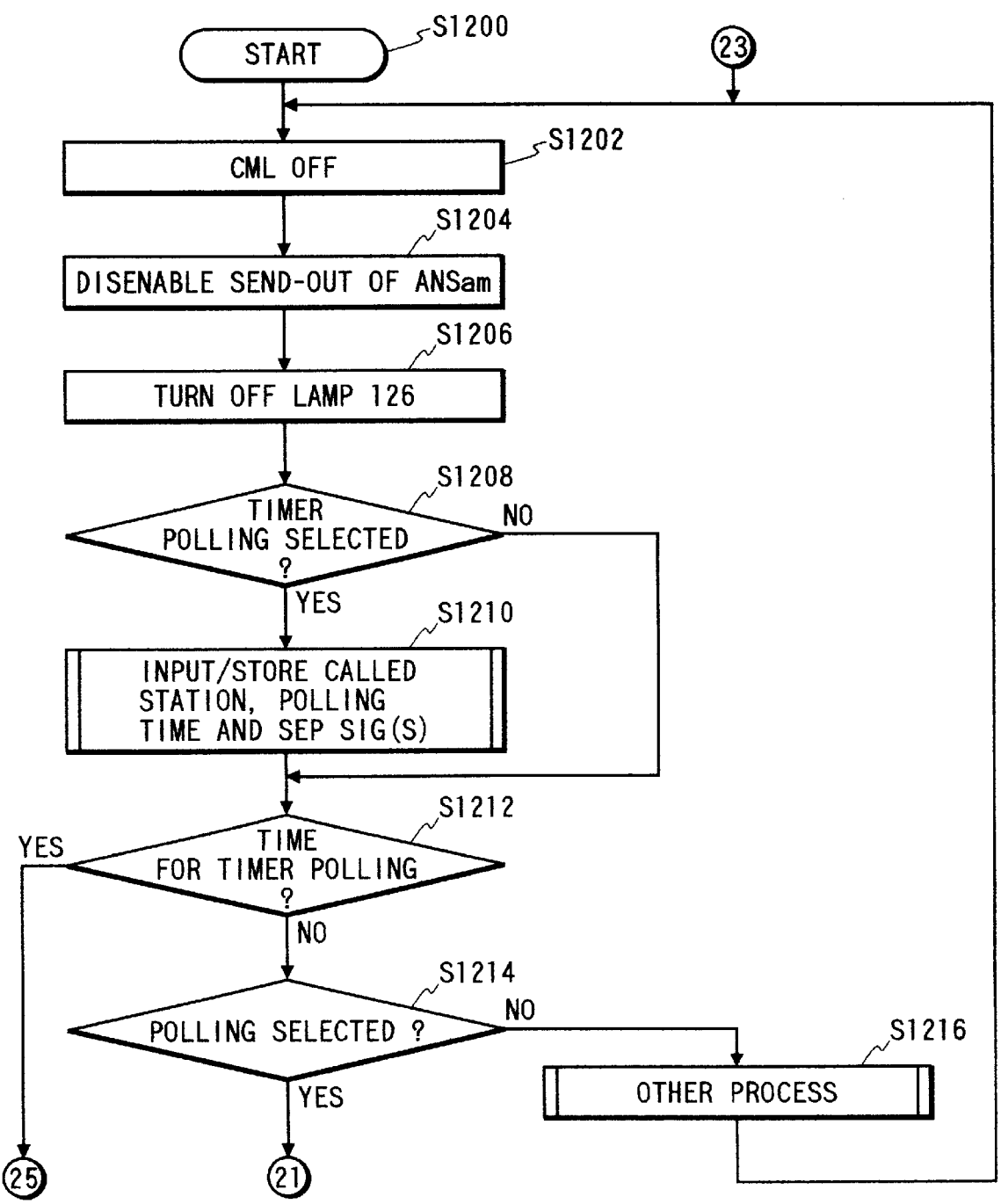
FIG. 15 is a flowchart showing operations of the fourth embodiment.
Figure 16:
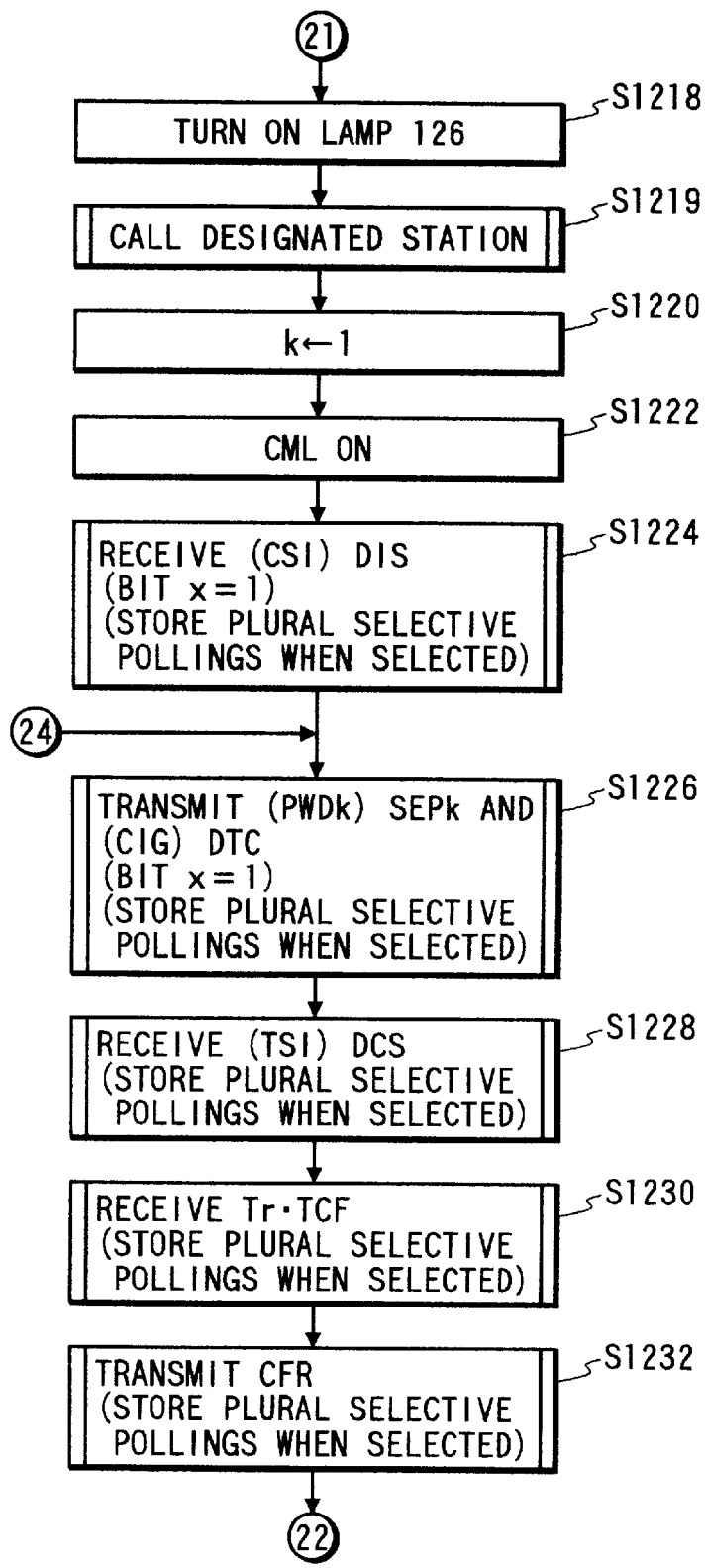
FIG. 16 is a flowchart showing operations of the fourth embodiment.
Figure 17:
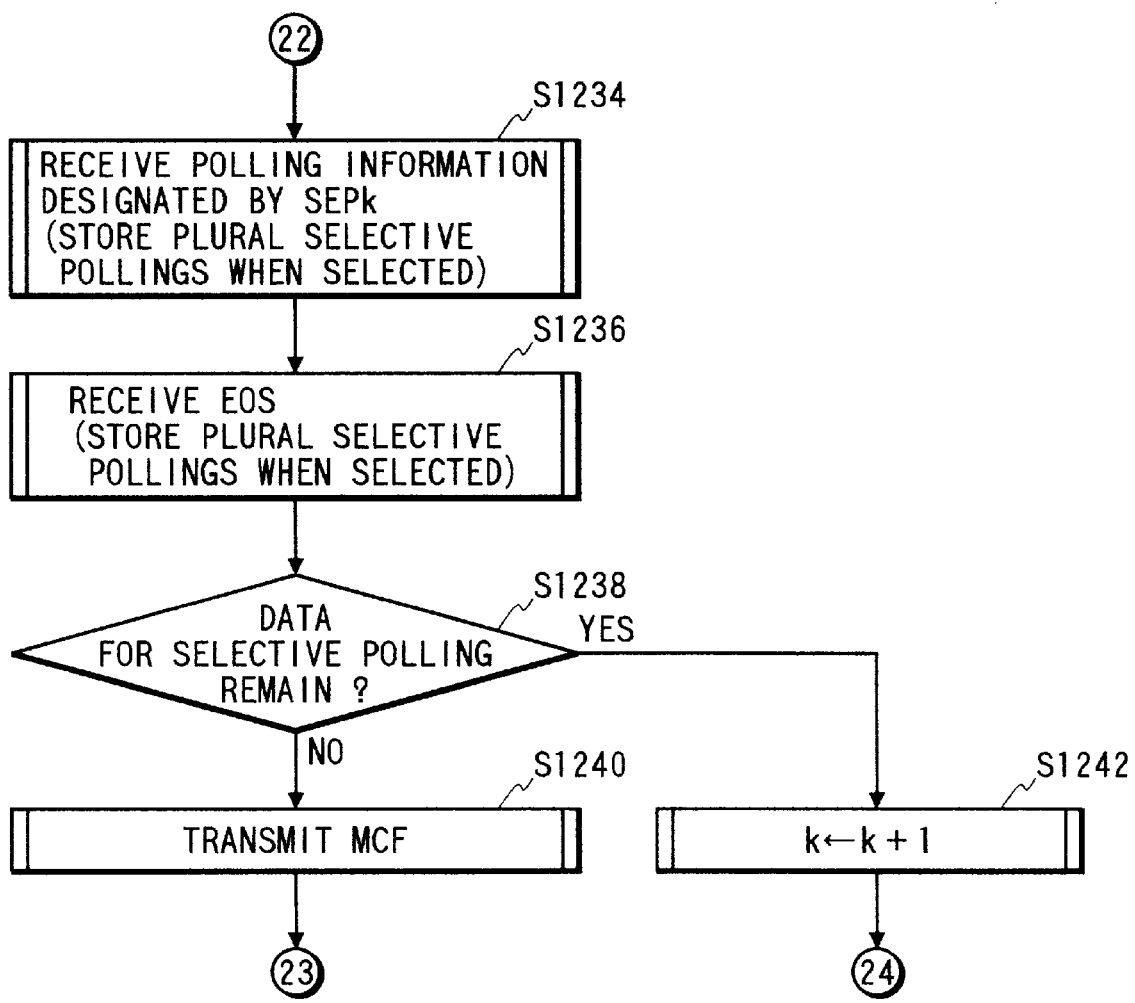
FIG. 17 is a flowchart showing operations of the fourth embodiment.
Figure 18:
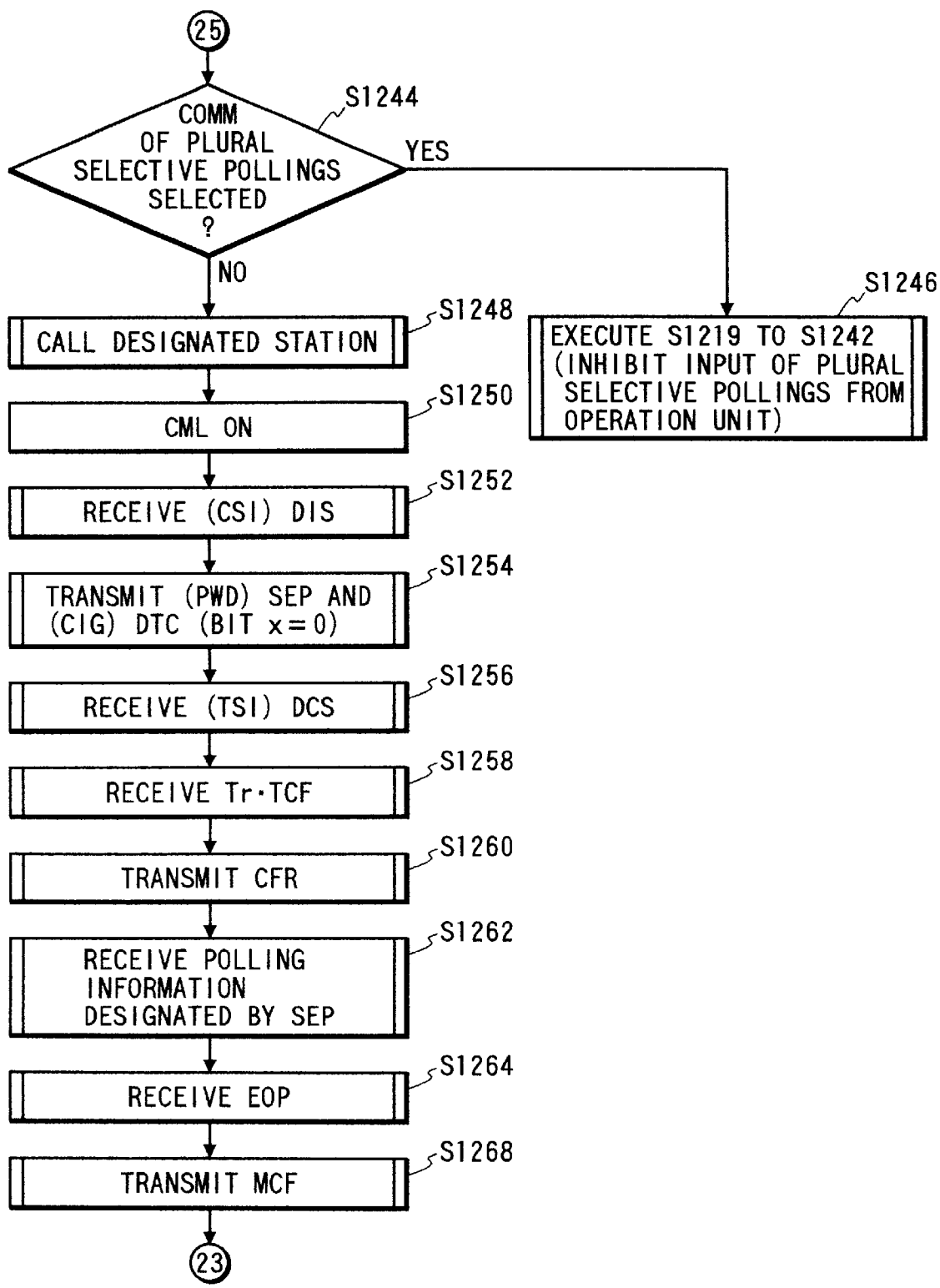
FIG. 18 is a flowchart showing operations of the fourth embodiment.

Referring to FIG. 15, control is started at step S1200. In step S1202, the control circuit 20 outputs a signal with signal level "0" to the signal line 20a to turn CML off. In step S1204, it outputs a signal with signal level "0" to the signal line 20d to disable send-out of the ANSam signal. In step S1206, it outputs a signal with signal level "0" to the signal line 20j to turn off the polling reception lamp 126.

In step S1208, the control circuit 20 takes in information of the signal line 24a to determine whether or not the timer polling mode has been selected. If the timer polling mode has been selected, it proceeds to step S1210 to take in information of the signal line 24a and information associated with a calling destination, polling reception time and a selective polling signal (SEP signal: plural inputs are possible) from the operation unit 24. Then, it proceeds to step S1212. If the timer polling mode has not been selected, it directly goes to S1212.

In step S1212, the control circuit 20 determines whether or not the timer polling reception has been registered and it is now the time for timer polling. It proceeds to step S1244 if YES or step S1214 if NO.

In step S1214, the control circuit 20 takes in a signal outputted to the signal line 24a to determine whether or not polling reception has been selected. It proceeds to step S1218 if polling reception has been selected, or to step S1216 if not to perform other processes.

In step S1218, the control circuit 20 outputs a signal with signal level "1" to the signal line 20j to turn on the lamp 126 to indicate that other polling is acceptable.

In step S1219, the control circuit 20 outputs a designated telephone number to the signal line 20f, generates a calling instruction pulse in the signal line 20g and calls the designated station through the calling circuit 22. In step S1220, it sets the text number k to be received by selective polling to 1. In step S1222, it outputs a signal with signal level "1" to the signal line 20a to turn CML on.

In step S1224, the control circuit 20 receives the (CSI)DIS signal. When bit x of FIF of the DIS signal is 1, it indicates that transmission of plural selective pollings during one communication is possible at the polling send station; when bit x of FIF of the DIS signal is 0, it indicates that transmission of plural selective pollings during one communication is impossible at the polling send station. Here, bit x of FIF of the DIS signal is assumed to be 1 for brief description. In addition, the control circuit 20 takes in information of the signal line 24a and stores plural selective pollings when selected via the operation unit 24.

In step S1226, the control circuit 20 transmits the (PWDk) SEPk and (CIG)DTC signals. Here, it sets bit x of FIF of the DTC signal to 1 to request the polling send station to accept plural selective pollings during one communication.

Specifically, after completion of polling transmission of a designated text, the polling send station transmits the EPS signal instead of the EOP signal. After that, when the SEPk and (CIG)DTC signals are received, selective pollings designated here are transmitted; when the MCF signal is received, the communication is terminated.

If bit x of FIF of the DTC signal is 0, the control circuit 20 does not request the polling send station to accept plural selective pollings during one communication. In this case, after completion of polling transmission of a designated text, the polling send station transmits the EOP signal. Also in step S1226, the control circuit 20 takes in information of the signal line 24a and stores plural selective pollings when selected via the operation unit 24.

Then, the control circuit 20 receives the (TSI)DCS signal in step S1228, receives the Tr•TCF signals in step S1230 and transmits the CFR signal in step S1232. Also in these steps, it takes in information of the signal line 24a and stores plural selective pollings when selected via the operation unit 24.

In step S1234, the control circuit 20 receives polling information designated by the SEPk signal. Here, a plurality of polling information are acceptable. Also in step S1234, it takes in information of the signal line 24a and stores plural selective pollings when selected via the operation unit 24.

In step S1236, the control circuit 20 receives the EOS signal. Here, it also takes in information of the signal line 24a and stores plural selective pollings when selected via the operation unit 24.

In step S1238, the control circuit 20 determines whether or not information to be received by selective polling remains. If information to be received by selective polling remains, it proceeds to step S1242 to increment the text number k by 1 and returns to step S1226. If information to be received by selective polling does not remain, it proceeds to step S1240 to transmit the MCF signal and returns to step S1202.

In step S1244, the control circuit 20 determines whether or not reception of plural selective pollings have been selected in a communication event. It proceeds to step S1246 if reception of plural selective pollings have been selected, or to step S1248 if not.

In step S1246, the control circuit 20 executes steps S1219 to S1242 described above. Here, it inhibits any input of plural selective pollings from operation unit 24.

In step S1248, the control circuit 20 outputs a designated telephone number to the signal line 20f, generates a calling instruction pulse in the signal line 20g and calls the designated station through the calling circuit 22. In step S1250, it outputs a signal with signal level "1" to the signal line 20a to turn CML on.

In step S1252, the control circuit 20 receives the (CSI)DIS signal, and in step S1254, it transmits the (PWD)SEP and (CIG)DTC signals, where bit x of FIF of the DTC signal is set to 0.

Then, the control circuit 20 receives the (TSI)DCS signal in step S1256, receives the Tr•TCF signals in step S1258 and transmits the CFR signal in step S1260. In step S1262, it receives polling information designated by the SEP signal, where reception of plural polling signals is acceptable.

In step S1264, the control circuit 20 receives the EOP signal. Then, it transmits the MCF signal in step S1266 and returns to step S1202.

Fifth Embodiment

As a fifth embodiment, during reception of plural selective pollings in the timer polling mode, a selective polling during the same communication can be accepted. Specifically, in this embodiment, step S1246 of the fourth embodiment has only to be changed to execute steps S1218 to S1242.

Although the above embodiment were described by taking a stand-alone facsimile apparatus by way of example, the present invention is not limited thereby and such facsimile capability can be used for data communication control in an integrated data processing system that combines copying capability and electronic file capability, and further data processing capability and communication capability. The communication function of the present invention can also be used for various data other than the image data described above.

According to the second embodiment, when plural selective pollings are to be received from a terminal capable of performing polling communication and the terminal on the polling send side does not has the function of plural selective pollings, since a display of it is made, the user can designate and perform one selective polling in an easy operation without inputting the selective polling again, thus providing a very convenient communication apparatus.

Also, according to the second embodiment, when plural selective pollings are selected by the user after calling and the polling send station side does not have the function of plural selective pollings, setting of the second and subsequent selective pollings is inhibited and a display of it is made, so that user's misunderstanding can be avoided, thus providing an easy-to-use communication apparatus.

According to the third embodiment, information registered for each calling destination as to whether or not communication of plural selective pollings is available can be updated to the newest one, thus enabling adequate determination.

According to the fourth embodiment, when one selective polling is selected in the real-time polling mode, additional selective polling reception is permitted in the middle of communication by requesting plural selective pollings from the polling send station side. On the other hand, in the timer polling mode, it is considered that additional selective polling reception is not frequent in the middle of the communication because of manual operation. Therefore, in this case (in the timer polling mode), communication for plural selective pollings is not requested to the polling send side and an existing protocol is applied, thereby extremely reducing protocol trouble.

Sixth Embodiment

Figure 19:
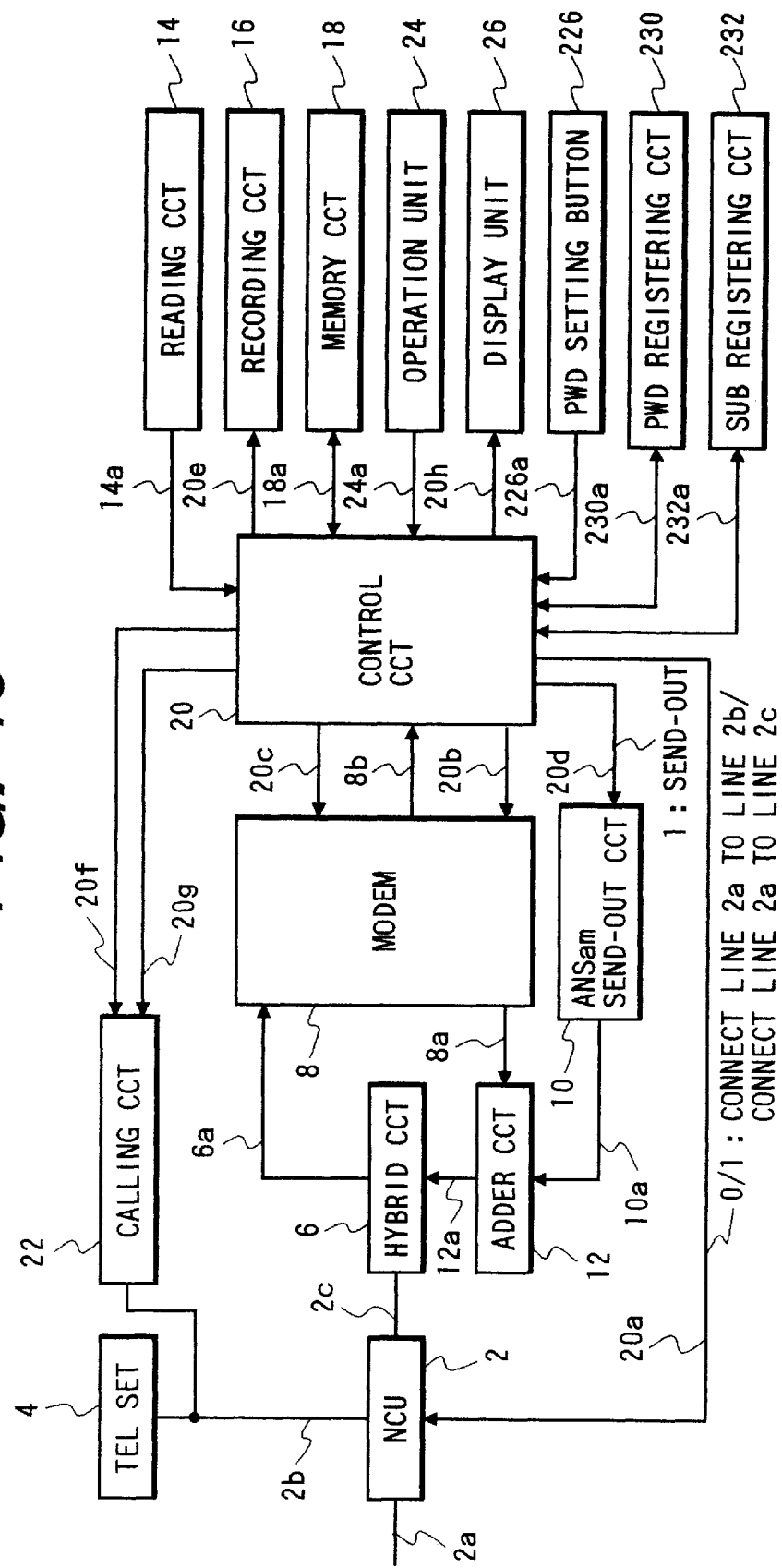
FIG. 19 is a block diagram showing a structure of a facsimile apparatus according to sixth and seventh embodiments of the present invention.

FIG. 19 is a block diagram showing a structure of a facsimile apparatus according to sixth and seventh embodiments of the present invention.

In FIG. 19, portions common to those in FIG. 1 are given the same reference numbers, and description thereof is omitted.

The operation unit 24 includes one-touch dialing keys, abbreviated dialing keys, a ten-key pad, */# keys, a set key, a start key, a register key to a circuit 230, a register key to a circuit 232, a how to use a sub-address (memory box or routing) and other function keys. Information associated with a pressed key is outputted to the signal line 24a.

A password setting button 226 is used for setting a password. When the button 226 is pressed, a pressed pulse is generated in a signal line 226.

A password registering circuit 230 is to register a password through a signal line 230a.

A sub-address registering circuit 232 is to register through a signal line 232a a sub-address (SUB signal) corresponding to the calling destination (one-touch dial or abbreviated dial), the user name, and how to use the sub-address. For example, it registers a SUB signal corresponding to the calling destination (one-touch dial 01), the user name (Yoshida) and how to use SUB (9999 for confidential communication when memory box is selected; 1234 when routing is selected).

In the facsimile apparatus according to the sixth embodiment which allows transmission of a sub-address signal usable for plural functions, when a destination, how to use a sub-address signal and a password are inputted, the control circuit 20 performs control processing for calling a partner station, receiving from the partner station information associated with how to use the sub-address signal, and displaying the received information.

In the partner facsimile apparatus required to indicate how to use the sub-address signal, when the received password and its own password accord, it notifies the partner station of how to use the sub-address signal designated. Here, a case where either memory box or routing is selected as information on how to use the sub-address signal, is described.

FIGS. 20 to 24 are flowcharts showing a control flow of the control circuit 20 according to the sixth embodiment.

Figure 20:
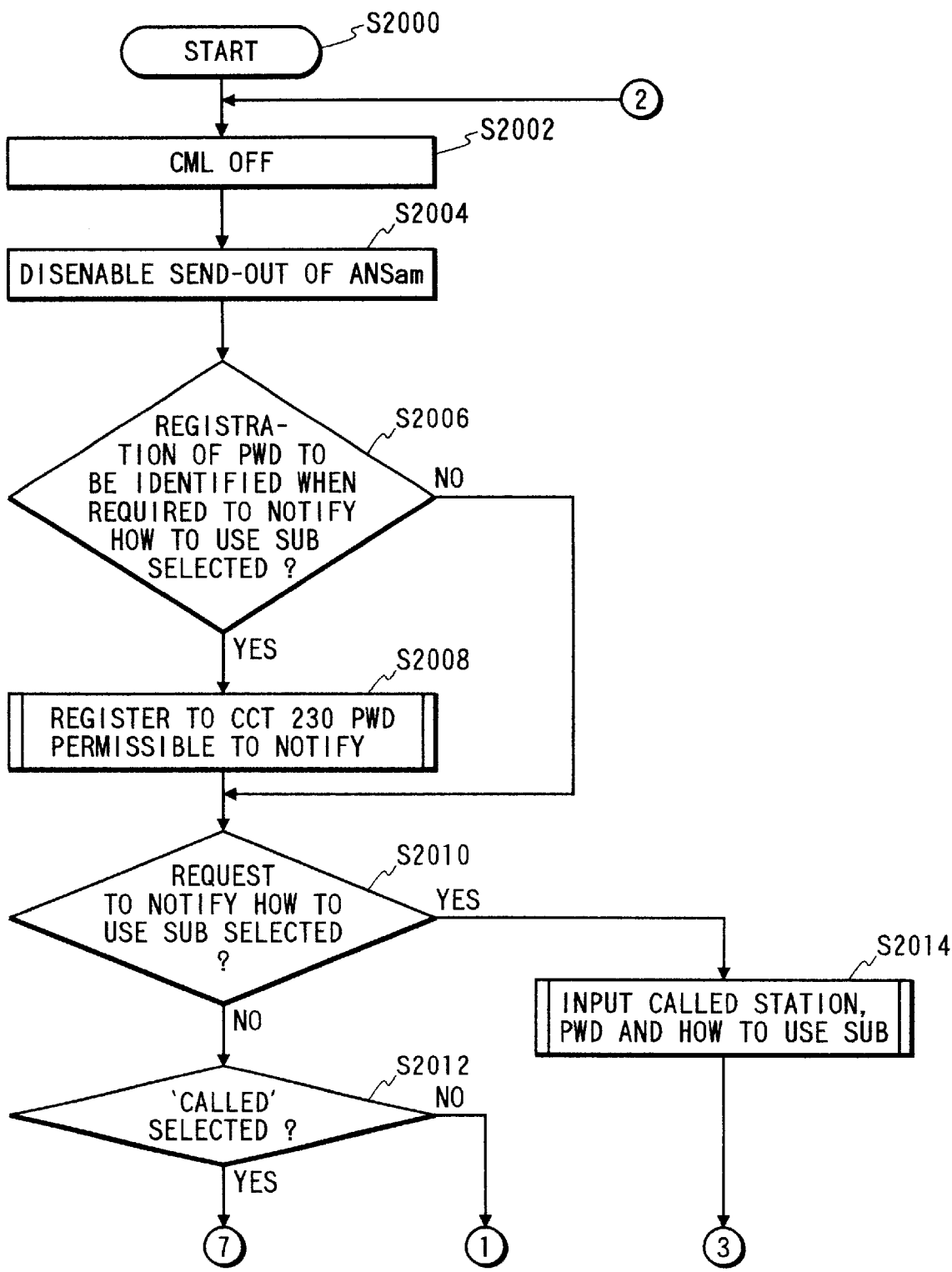
FIG. 20 is a flowchart showing operations of the sixth embodiment.
Figure 21:
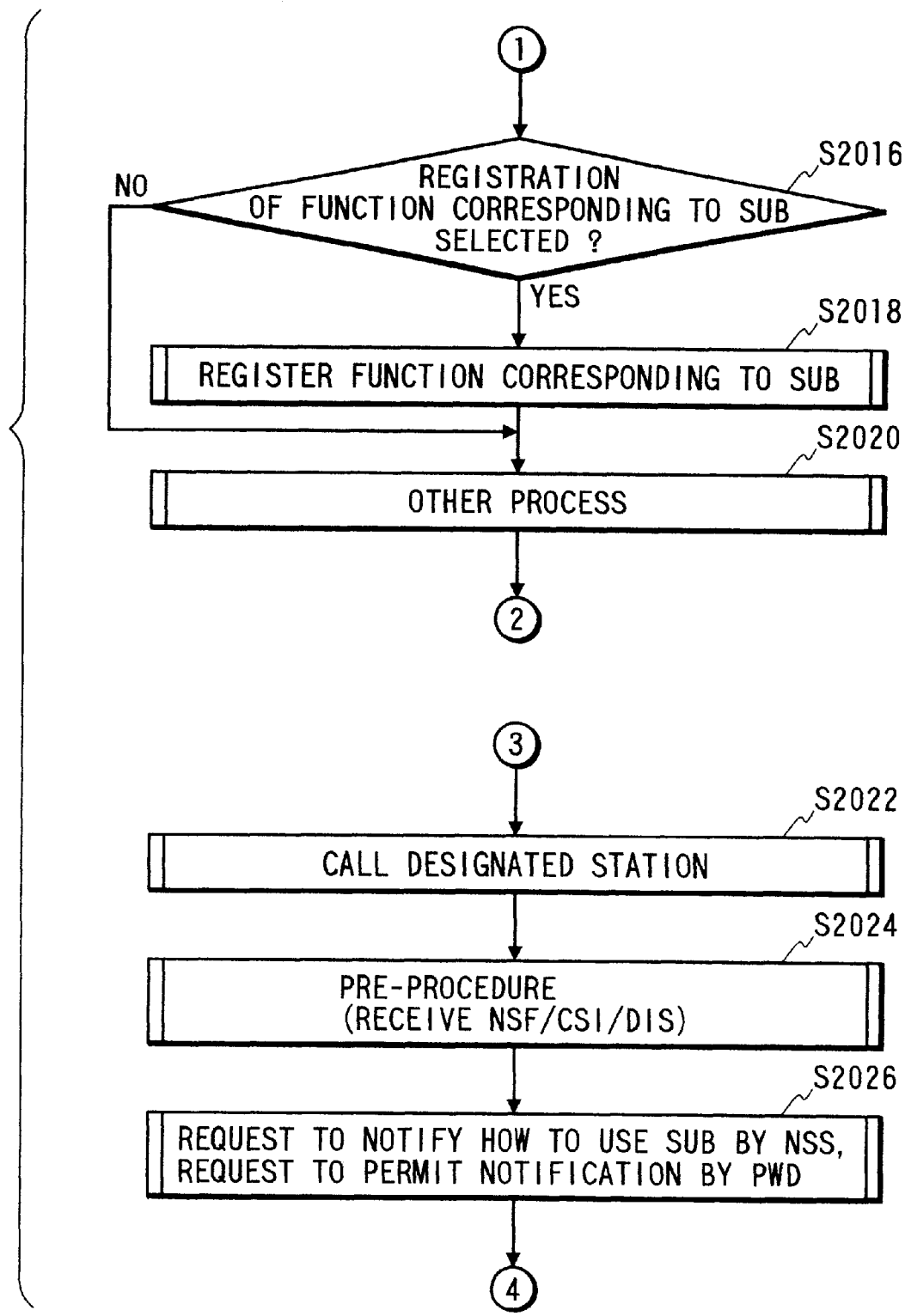
FIG. 21 is a flowchart showing operations of the sixth embodiment.
Figure 22:
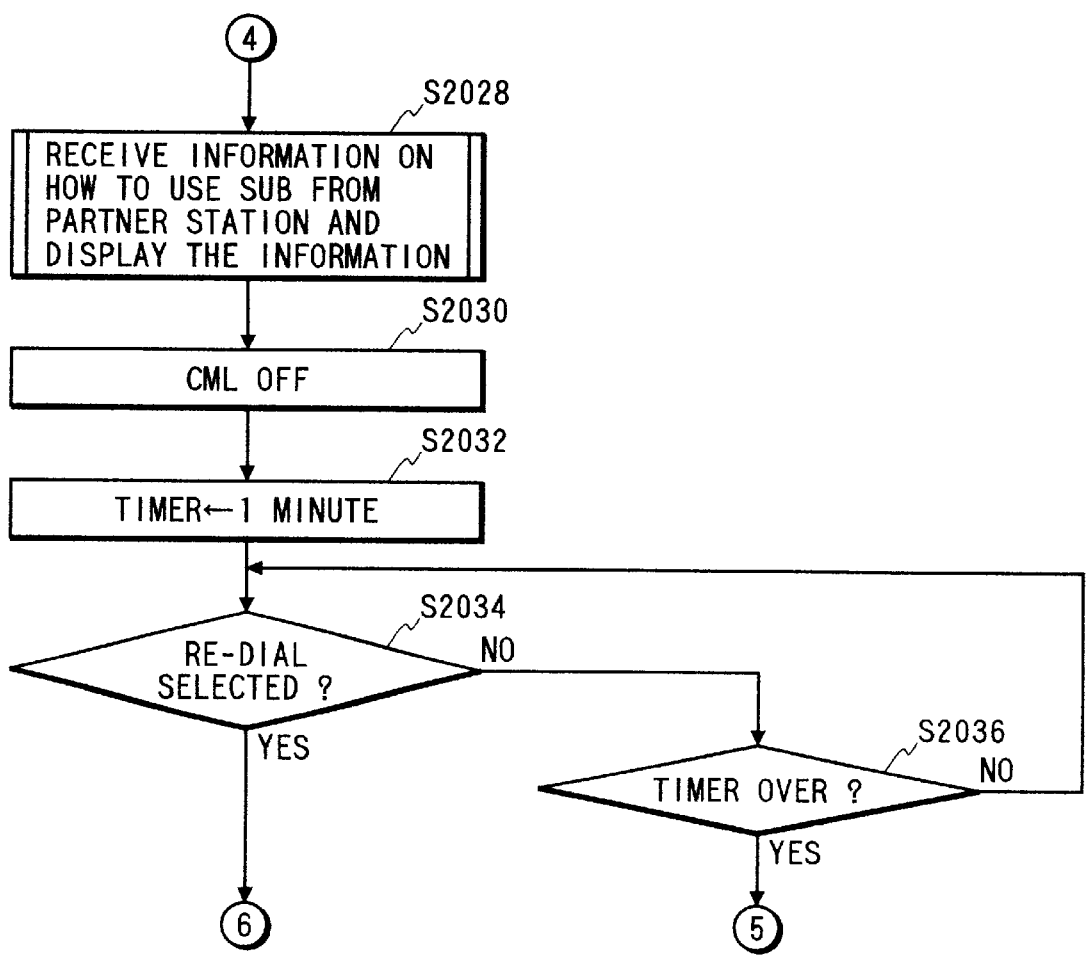
FIG. 22 is a flowchart showing operations of the sixth embodiment.
Figure 23:
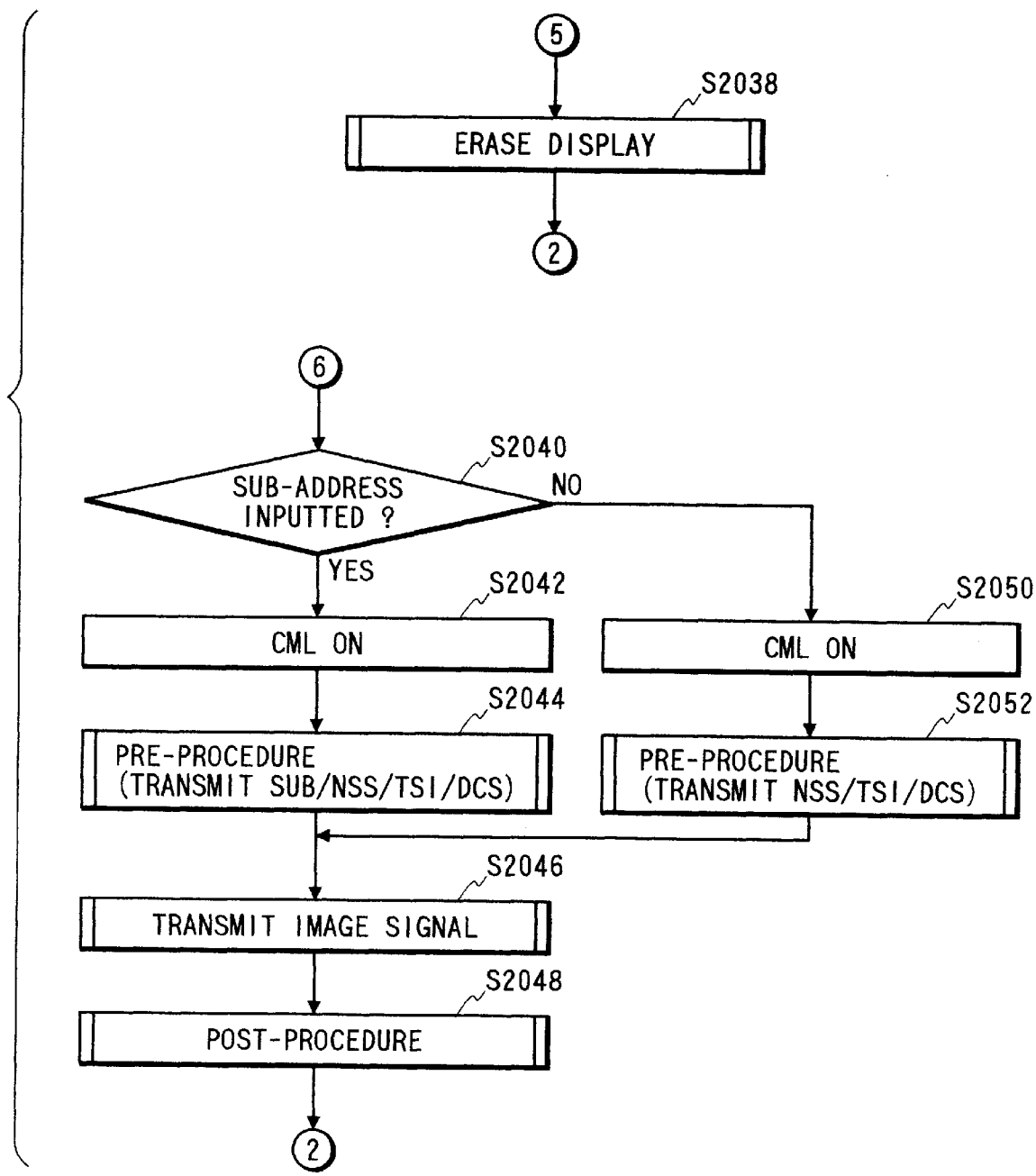
FIG. 23 is a flowchart showing operations of the sixth embodiment.
Figure 24:
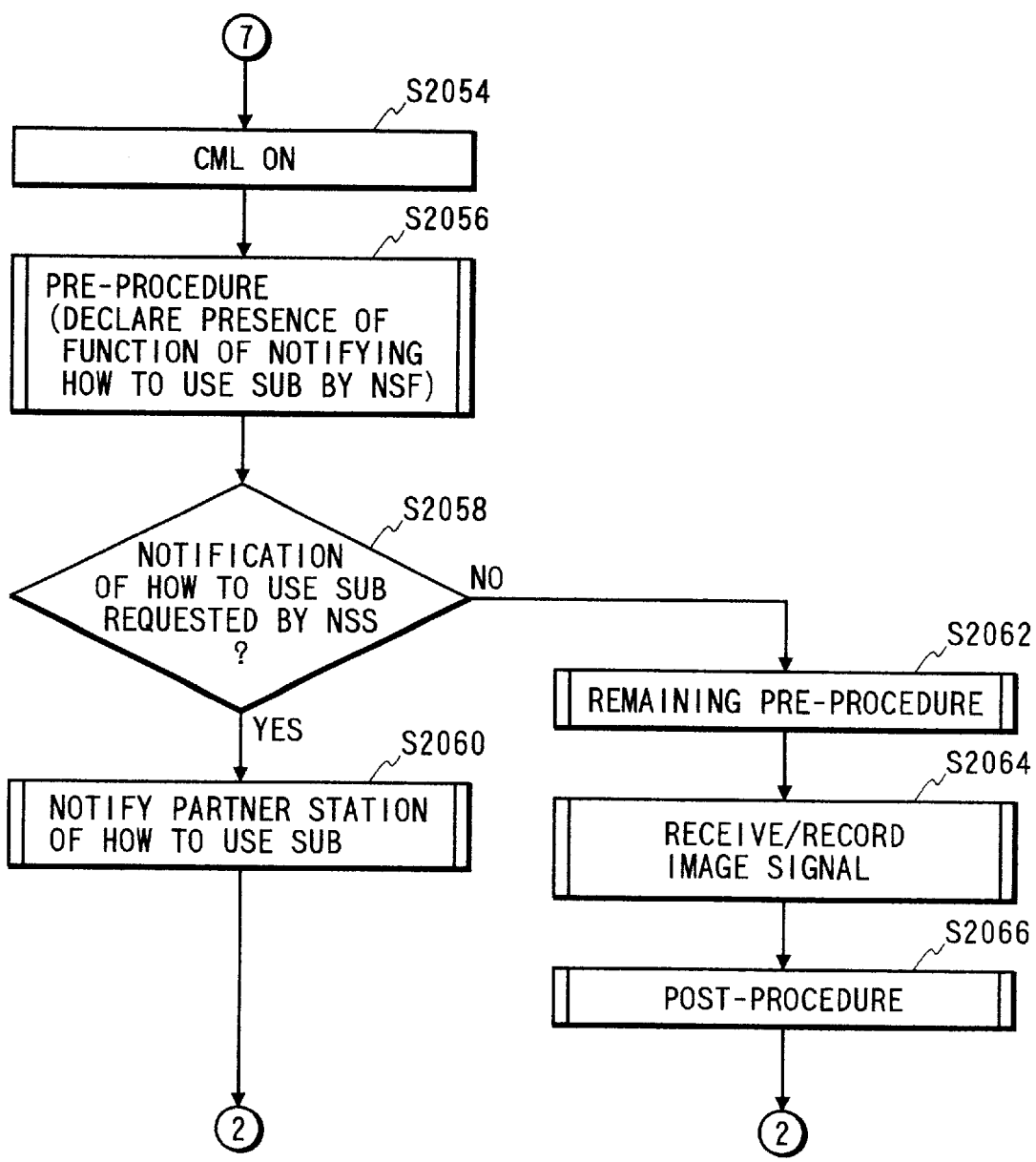
FIG. 24 is a flowchart showing operations of the sixth embodiment.

Referring to FIG. 20, control is started at step S2000. In step S2002, the control circuit 20 outputs a signal with signal level "0" to the signal line 20a to turn CML off. In step S2004, it outputs a signal with signal level "0" to the signal line 20d to disable send-out of the ANSam signal.

In the embodiment, when required to notify the partner station of examples of functions that can be performed by a SUB signal (hereinbelow, simply referred to as notification of how to use SUB), if the PWD (password) signal and a password registered on the receive station side accord, the control circuit 20 permits notification of how to use SUB. In step S2006, it determines whether or not registration of this password has been selected. If selected, it proceeds to step S2008 to register to the registration circuit 230 through the signal line 230a the password permissible to notify when required to notify how to use SUB. If not selected, it proceeds to step S2010.

In step S2010, the control circuit 20 takes in information of the signal line 24a to determine whether or not a request to notify how to use SUB has been selected. If selected, it proceeds to step S2014 to take in through the signal lines 24a and 226 information associated with the calling destination, the password and how to use SUB (memory box or routing). If not selected, it proceeds to step S2012.

In step S2012, the control circuit 20 determines whether or not "called (incoming call)" has been selected. It proceeds to step S2054 if "called" has been selected, or to step S2016 if not.

In step S2016, the control circuit 20 takes in information of the signal line 24a to determine whether or not registration of the receive-station side function corresponding to the SUB designation has been selected. If selected, it proceeds to step S2018 to register the function corresponding to the SUB designation into the memory circuit 18.

Specifically, it assigns a memory box corresponding to the sub-address to store either confidential communication or memory reception. Also, it stores a list of routing destinations corresponding to the sub-address.

If registration of the receive-station side function corresponding to the SUB designation has not been selected, the control circuit 20 proceeds to step S2020 to perform other processes and returns to step S2002.

In step S2022, the control circuit 20 calls the designated station through the calling circuit 22. In step S2024, it performs remaining pre-procedure to receive NSF/CSI/DIS signals. In step S2026, it requests the partner station to notify how to use SUB (memory box or routing) by NSS signal, and to permit the notification by PWD signal.

In step S2028, the control circuit 20 receives information on how to use SUB from the partner station and displays the information on the display unit 26. For example, when the calling destination (called station) has notified the calling station of memory box as information on how to use SUB, the control circuit 20 displays 9999 for confidential communication and any except 9999 for memory reception; when the called station has notified the calling station of routing as information on how to use SUB, it displays 0010 for a terminal 1, 0020 for a terminal 2, 0030 for a terminal 3, 0040 for a terminal 4 and 0050 for a terminal 5.

In step S2030, the control circuit 20 outputs a signal with signal level "0" to the signal line 20a to turn CML off. In step S2032, it sets timer to 1 minute.

In steps S2034 and S2036, the control circuit 20 determines whether or not re-dialing has been selected before timer is over. It proceeds to step S2040 if re-dialing has been selected, or to step S2038 if not. In step S2038, it erases the display on the display unit 26.

In step S2040, the control circuit 20 takes in information of the signal line 24a to determine whether or not input of a sub-address has been selected. It proceeds to step S2042 if input of a sub-address has been selected, or to step S2050 if not.

In step S2042, the control circuit 20 outputs a signal with signal level "1" to the signal line 20a to turn CML on. Then, it performs pre-procedure in step S2044, in which SUB/NSS/TSM/DCS signals inputted here are transmitted. Next, it transmits an image signal in step S2046, performs post-procedure in step S2048, and returns to step S2002.

In step S2050, the control circuit 20 outputs a signal with signal level "1" to the signal line 20a to turn CML on. In step S2052, it performs pre-procedure, in which NSS/TSI/DCS signals are transmitted. Then, it goes to step S2046.

In step S2054, the control circuit 20 outputs a signal with signal level "1" to the signal line 20a to turn CML on. In step S2056, it performs pre-procedure, in which presence of a function for notifying the partner station of how to use SUB is declared by NSF signal.

In step S2058, the control circuit 20 determines whether or not notification of how to use SUB is requested by NSS signal. If requested, it proceeds to step S2060 to notify the partner station of how to use SUB (memory box or routing), i.e., to transmit information received at step S2028. If not requested, it performs remaining pre-procedure (S2062), executes reception/recording of the image signal (S2064) and performs post-procedure (S2066). Then, it returns to step S2002.

Seventh Embodiment

A seventh embodiment will next be described.

In the seventh embodiment, the facsimile apparatus that transmits a sub-address signal in the sixth embodiment, carries out transmission of a desirable sub-address signal in a manner such as to register to the registration circuit 232 a sub-address corresponding to the destination (station to be called), the user name and how to use SUB, and to input the destination (station to be called) after inputting identification information associated with the user and information on how to use SUB.

Figure 25:
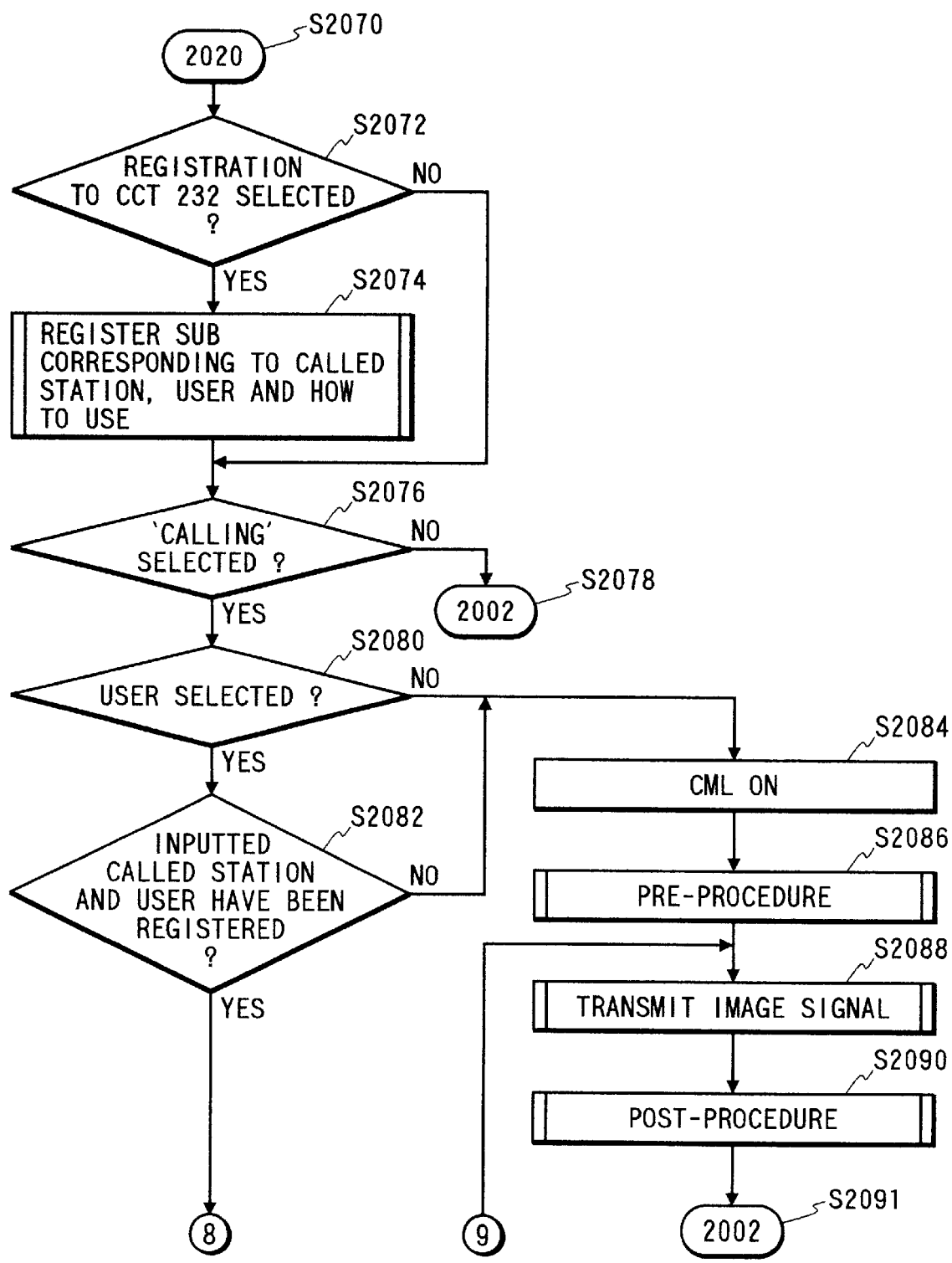
FIG. 25 is a flowchart showing operations of the seventh embodiment.
Figure 26:
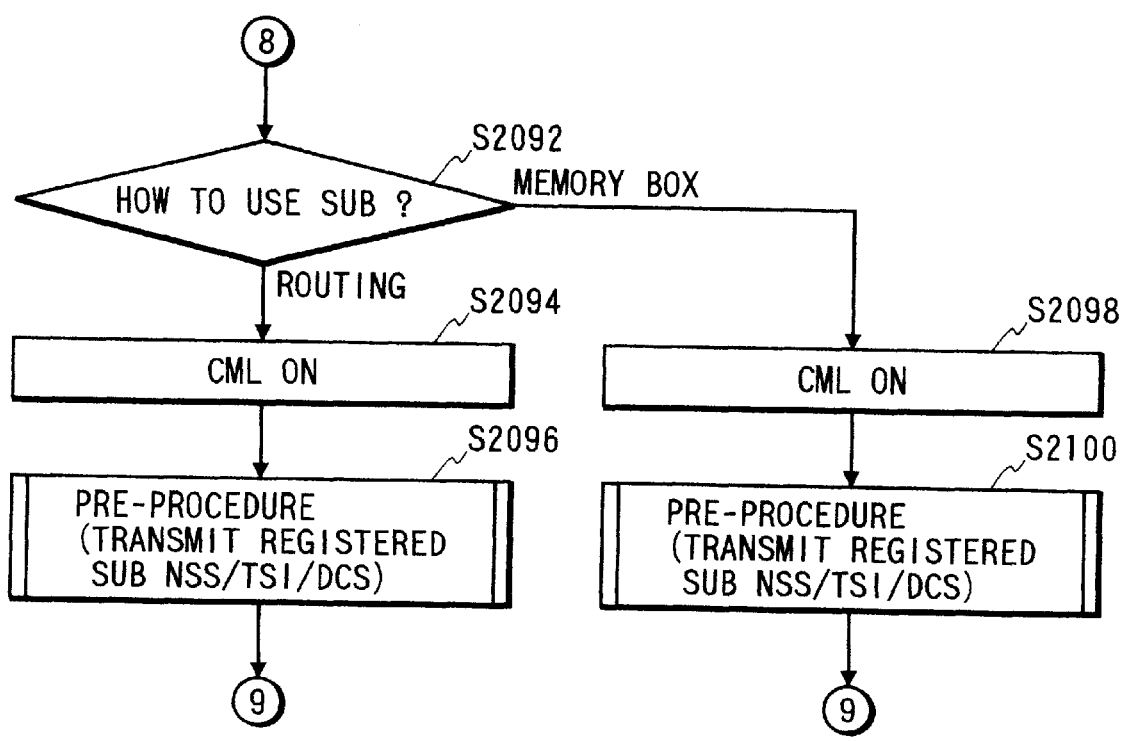
FIG. 26 is a flowchart showing operations of the seventh embodiment.

FIGS. 25 and 26 are flowcharts showing portions of control operations of the control circuit 20 in the seventh embodiment different from the sixth embodiment.

Referring to FIG. 25, step S2070 represents step S2020 described above. In step S2072, the control circuit 20 takes in information of the signal line 24a to determine whether or not registration to the registration circuit 232 has been selected. It proceeds to step S2074 if registration has been selected, or to step S2076 if not.

In step S2074, the control circuit 20 registers to the registration circuit 232 a SUB signal corresponding to a calling destination (called station, e.g., one-touch dial 01), a user name (e.g., Yoshida) and how to use SUB (e.g., 9999 for confidential communication when memory box is selected; 1234 when routing is selected).

In step S2076, the control circuit 20 takes in information of the signal line 24a to determine whether or not calling has been selected. It proceeds to step S2080 if calling has been selected, or to step S2078 (corresponding to step S2002) if not. In step S2080, it takes in information of signal line 24a to determine whether or not a user has been selected. It proceeds to step S2082 if a user has been selected, or to step S2084 if not.

In step S2082, the control circuit 20 takes in information of the signal line 232a to determine whether or not the destination and the user name are registered in the circuit 232. It proceeds to step S2092 if they are registered, or to step S2084 if not.

In step S2084, the control circuit 20 outputs a signal with signal level "1" to the signal line 20a to turn CML on. Then, it performs pre-procedure in step S2086, transmits an image signal in step S2088, performs post-procedure in step S2090, and returns to step S2002 from step S2091.

In step S2092, the control circuit 20 takes in information of the signal line 24a to determine whether either memory box or routing is selected as information on how to use SUB. It proceeds to step S2098 if memory box is selected, or to step S2094 if routing is selected.

In step S2094, the control circuit 20 outputs a signal with signal level "1" to the signal line 20a to turn CML on. In step S2096, it performs pre-procedure. Here, it takes in information of the signal line 232a, transmits registered SUB (e.g., 1234) and NSS/TSI/DCS signals corresponding to the destination, the user name, and the information indicating that SUB is used for routing, and returns to step S2088.

In step S2098, the control circuit 20 outputs a signal with signal level "1" to the signal line 20a to turn CML on. In step S2100, it performs pre-procedure. Here, it takes in information of the signal line 232a, transmits registered SUB (e.g., 9999) and NSS/TSI/DCS signals corresponding to the destination, the user name, and the information indicating that SUB is used for memory box, and returns to step S2088.

Eighth Embodiment

An eighth embodiment will next be described.

Figure 27:
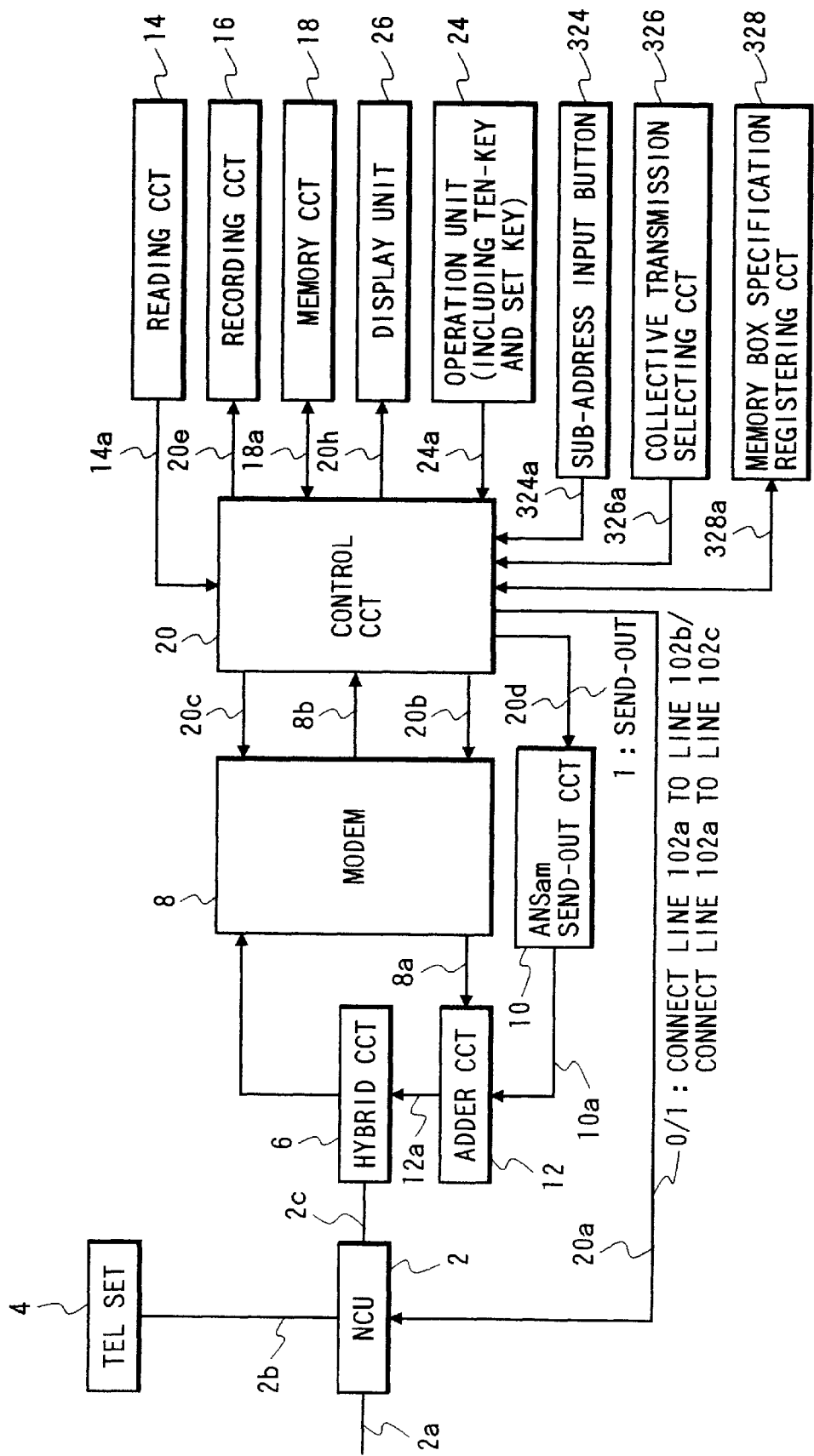
FIG. 27 is a block diagram showing a structure of a facsimile apparatus according to eighth and ninth embodiments of the present invention.

FIG. 27 is a block diagram showing a structure of a facsimile apparatus that carries out eighth and ninth embodiments. In FIG. 27, portions common to those in FIG. 1 are given the same reference numbers, and description thereof is omitted.

A sub-address input button 324 is used for inputting a sub-address. The sub-address to be transmitted from the send station side is inputted by pressing this button, input of ten-key and */# key, or pressing other set key. When the sub-address input button 324 is pressed, a pressed pulse is generated in the signal line 324a.

A collective transmission selecting circuit 326 is to select whether or not collective transmission is to be executed when the send station side has texts to be transmitted to the same destination. When collective transmission is selected, a signal with signal level "1" is outputted to a signal line 326a; when collective transmission is not selected, a signal with signal level "0" is outputted to the signal line 326a.

A registration circuit 328 is to register a specification corresponding to each memory box, where one sub-address is registered for each memory box and a specification such as to indicate "execute confidential reception" or "transfer to a predetermined destination" is registered.

Here, there are provided 100 memory boxes numbered from 00 to 99. The sub-address is represented by 20 digits. The registration to the registration circuit 328 is executed through a signal line 328.

The display unit 26 may be an LCD, which displays information outputted to a signal line 20h, e.g., displays "sub-address transmission is selected but the partner station does not have a function for receiving sub-addresses".

In the facsimile apparatus of the present embodiment according to the ITU-T recommendations T.30, the control circuit 20 uses the DIS signal to perform control processing for notifying the partner station of presence or absence of a function of receiving one sub-address signal (bit 49 of FIF) and presence or absence of a function of receiving plural sub-address signals during one communication (bit x of FIF).

On the other hand, when a user on the side of the partner facsimile apparatus that receives the DIS signal intends to perform collective transmission of plural sub-address signals during one communication for each individual destination, the control circuit 20 transmits plural sub-address signals if the partner receive station has a function of receiving plural sub-address signals during one communication, or transmit one sub-address signal during one communication and repeats such communication processing plural times if the partner receive station only has the function of receiving one sub-address signal, or terminates the communication and displays it if the partner receive station does not have the function of receiving any sub-address signal.

Then, it uses the DCS signal to perform control processing for notifying the partner station of whether or not one sub-address signal is to be transmitted (bit 49 of FIF) and whether or not plural sub-address signals are to be transmitted (bit x of FIF) during one communication.

FIGS. 28 to 38 are flowcharts showing a control flow of the control circuit 20 according to the eighth embodiment.

Figure 28:
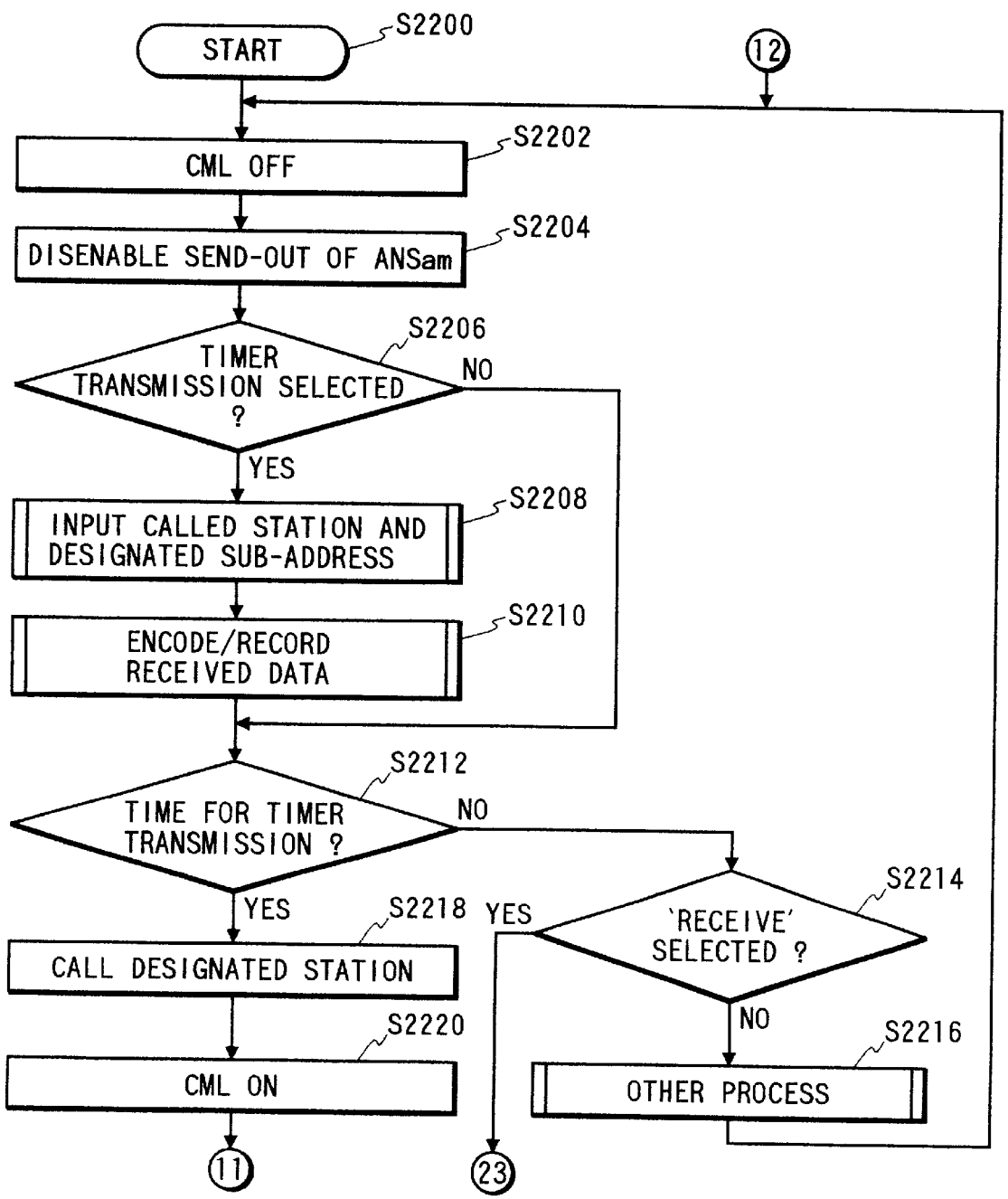
FIG. 28 is a flowchart showing operations of the eighth embodiment.
Figure 29:
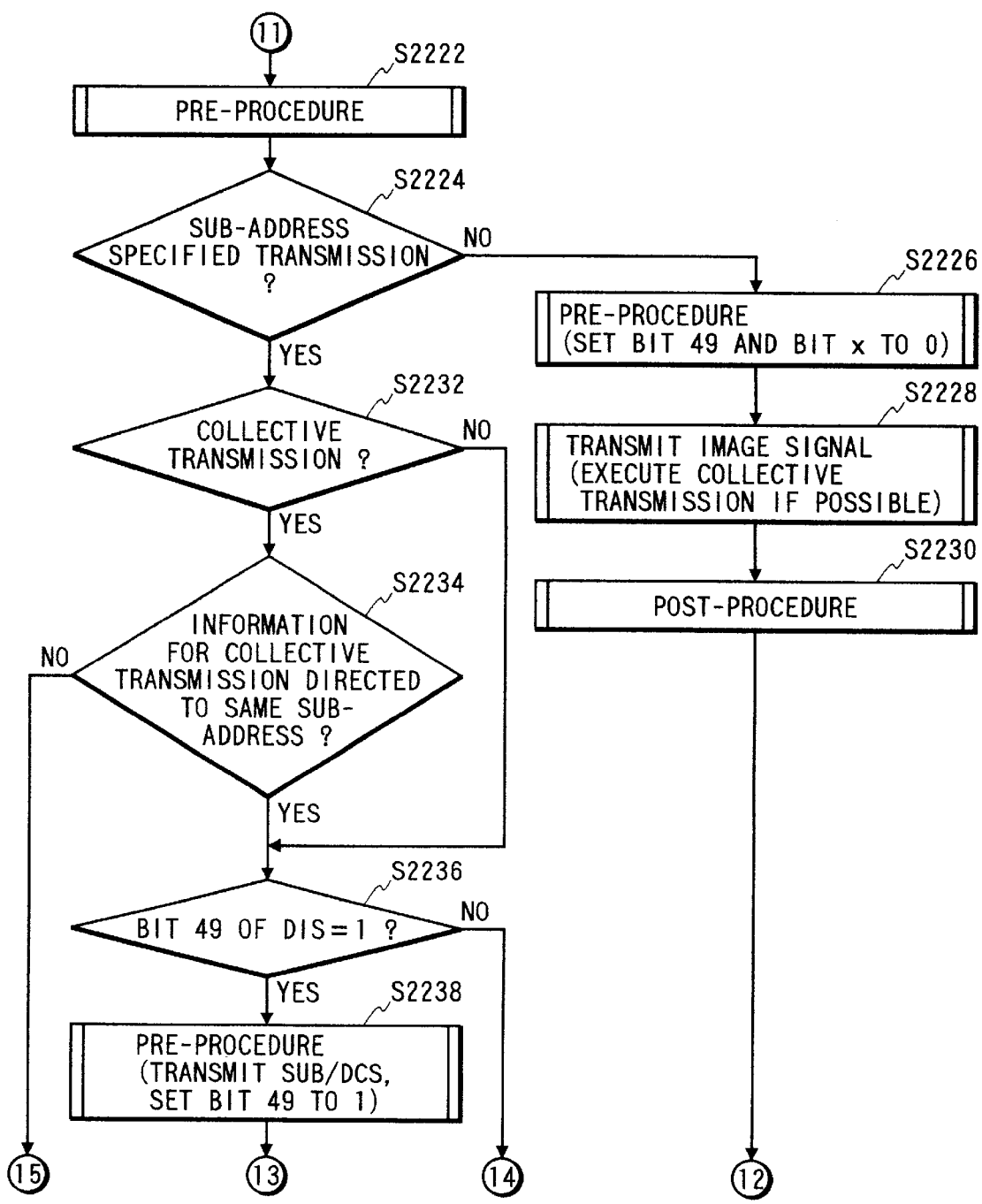
FIG. 29 is a flowchart showing operations of the eighth embodiment.
Figure 30:
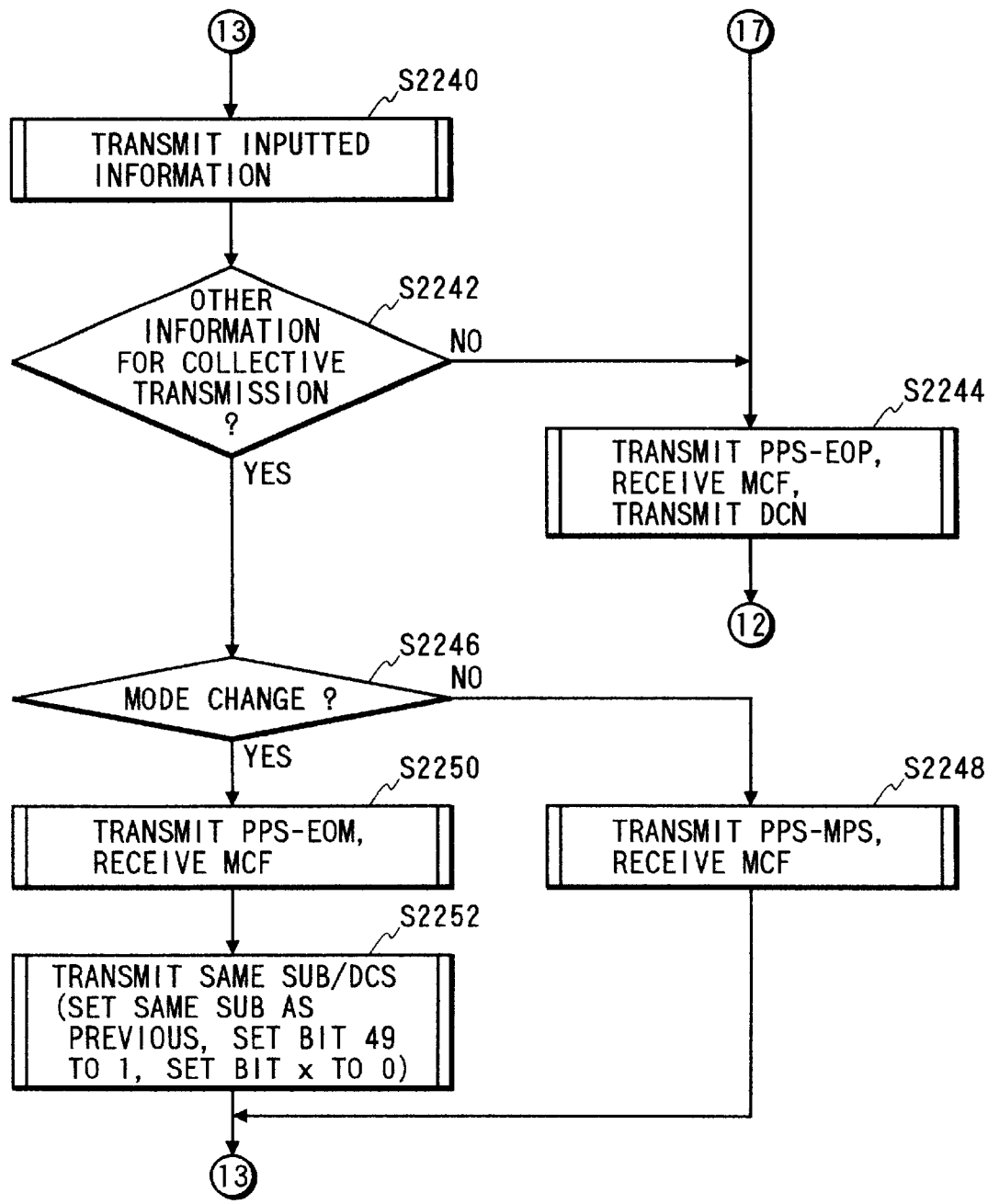
FIG. 30 is a flowchart showing operations of the eighth embodiment.
Figure 31:
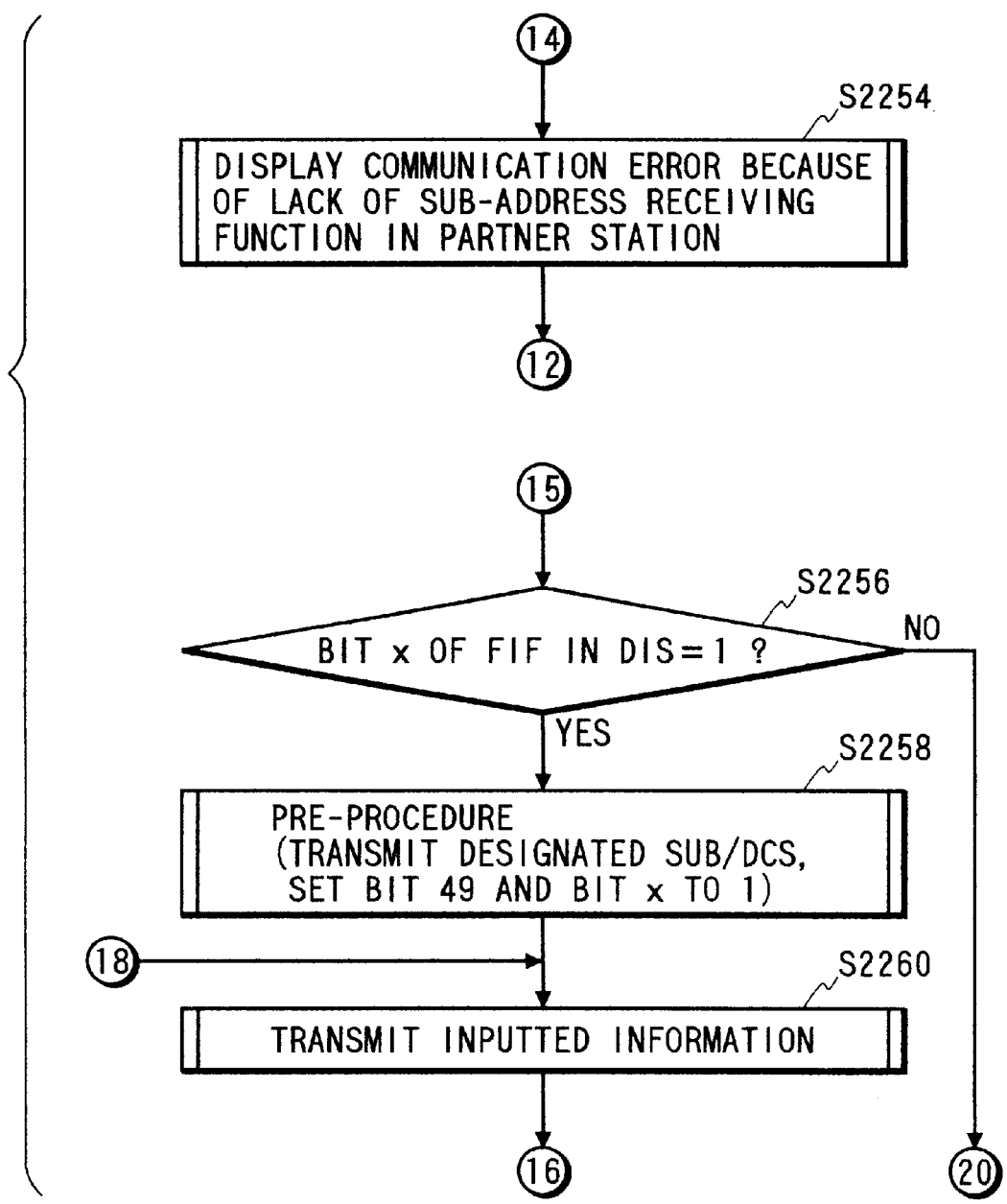
FIG. 31 is a flowchart showing operations of the eighth embodiment.
Figure 32:
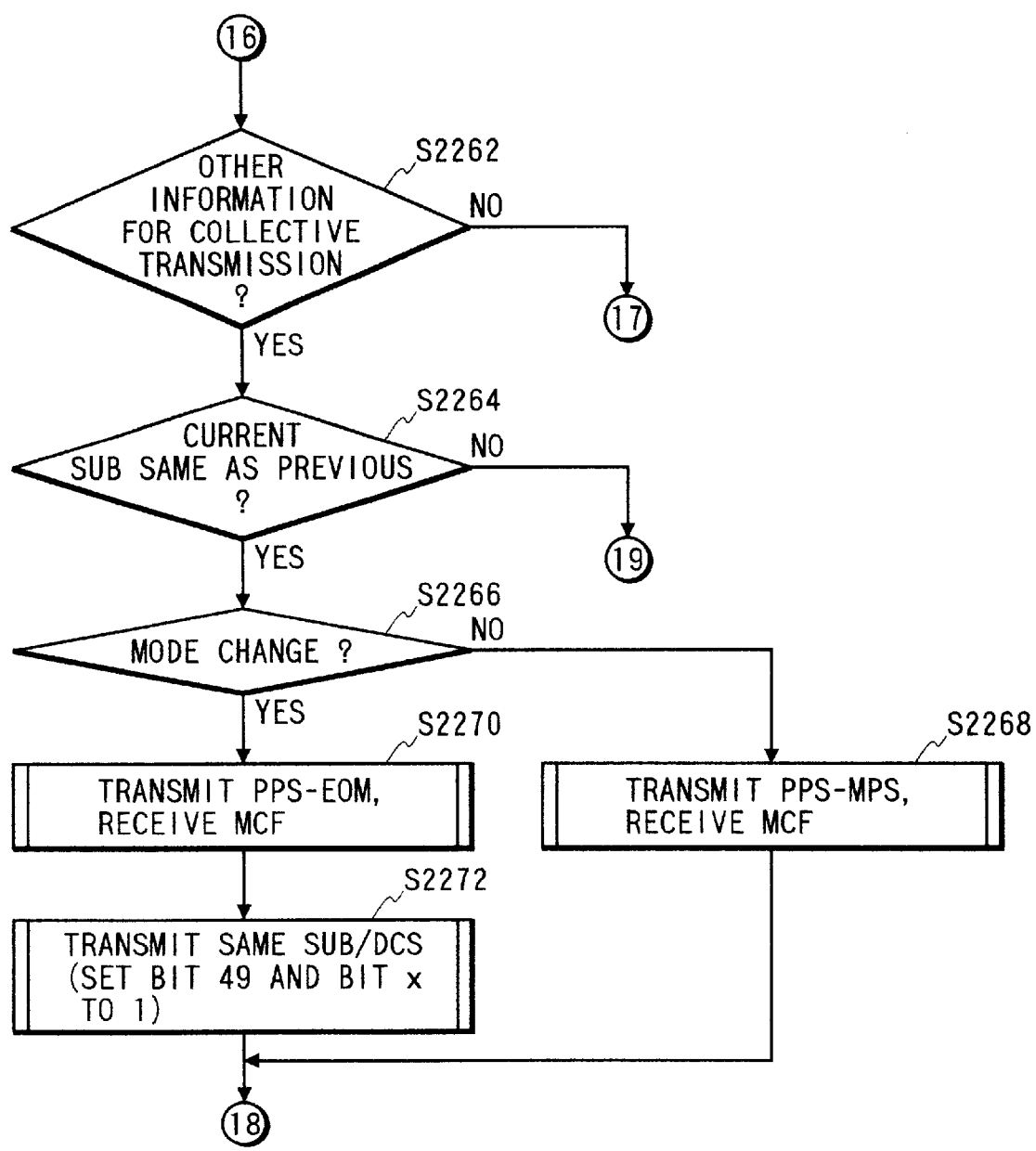
FIG. 32 is a flowchart showing operations of the eighth embodiment.
Figure 33:
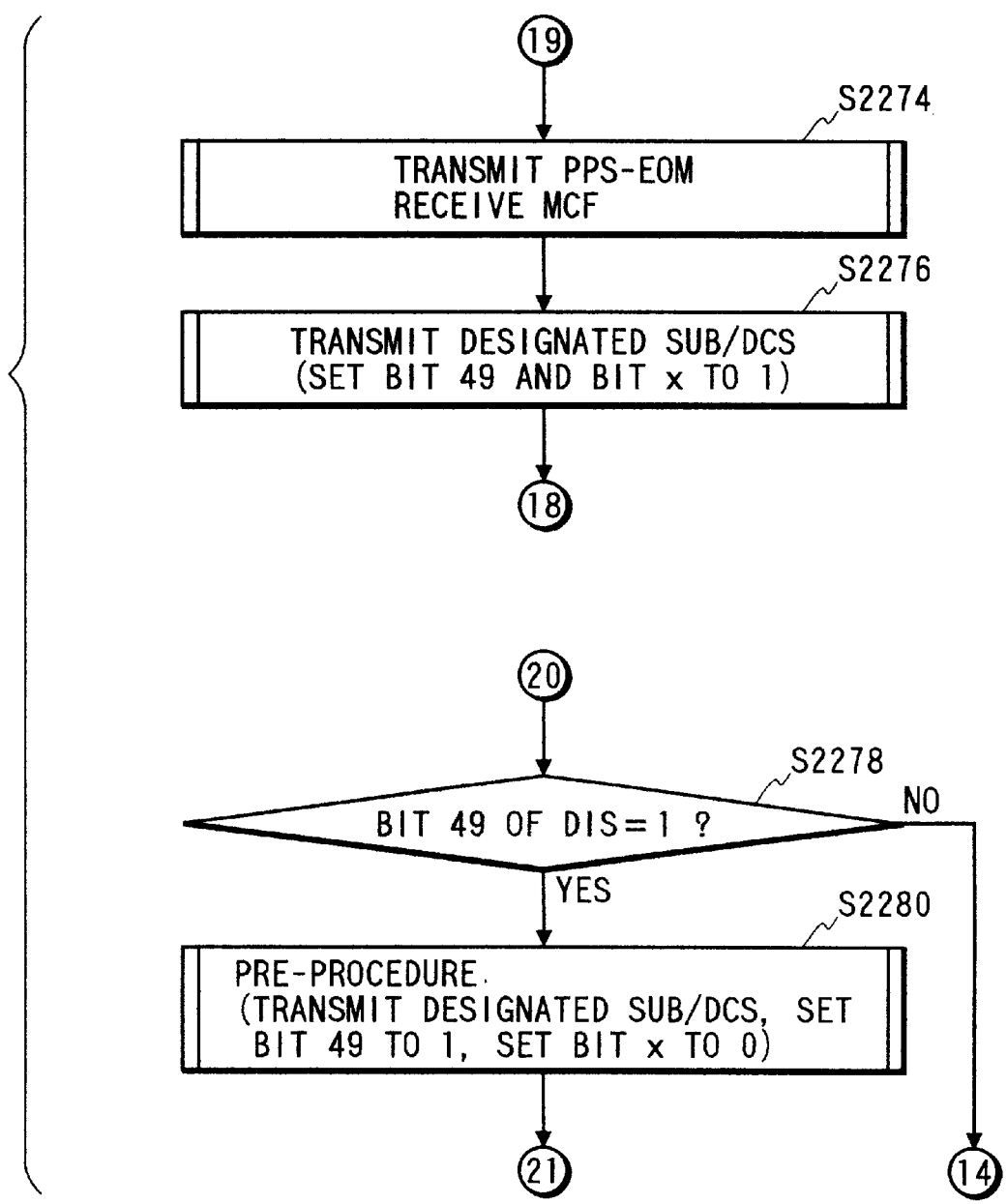
FIG. 33 is a flowchart showing operations of the eighth embodiment.
Figure 34:
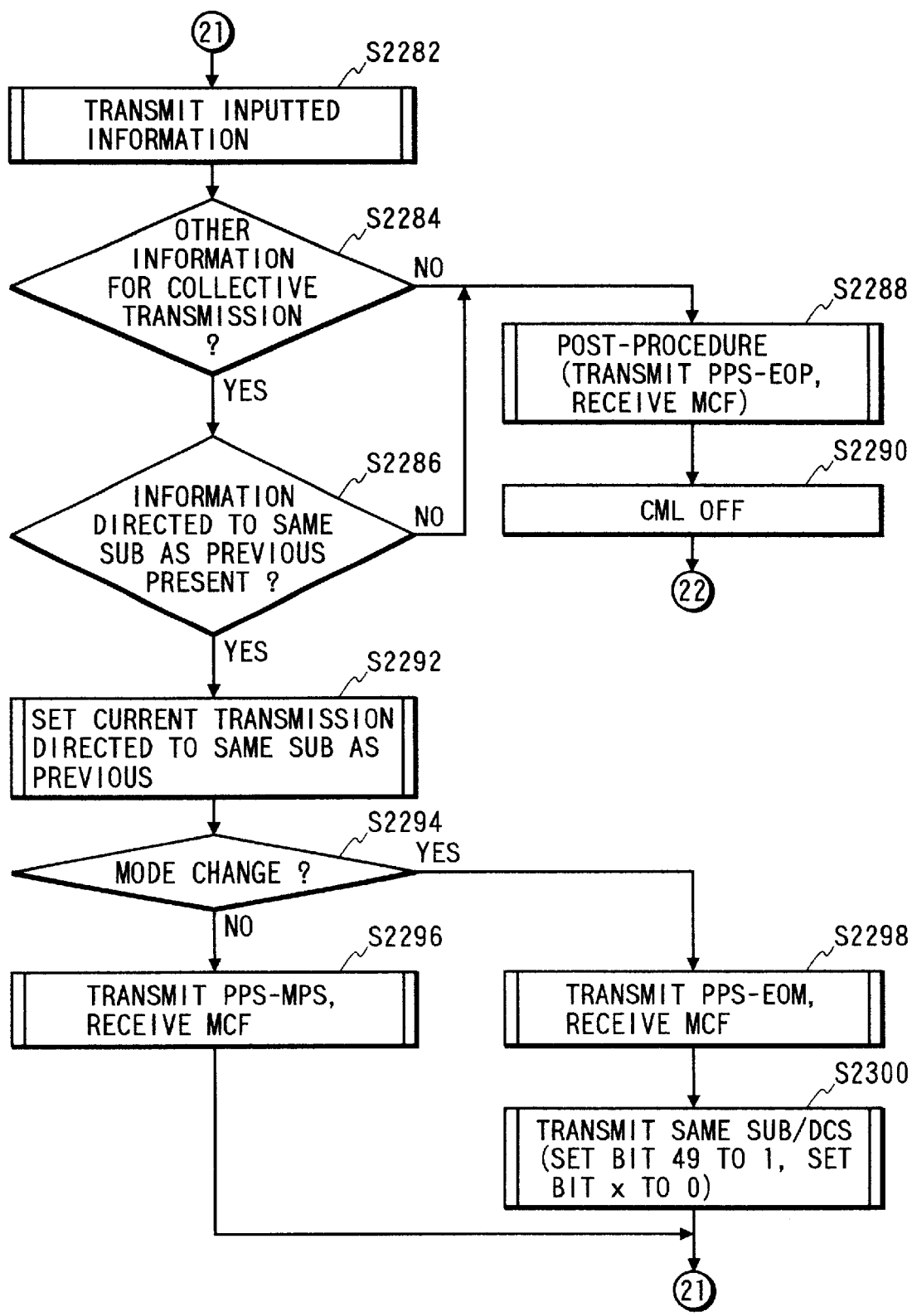
FIG. 34 is a flowchart showing operations of the eighth embodiment.
Figure 35:
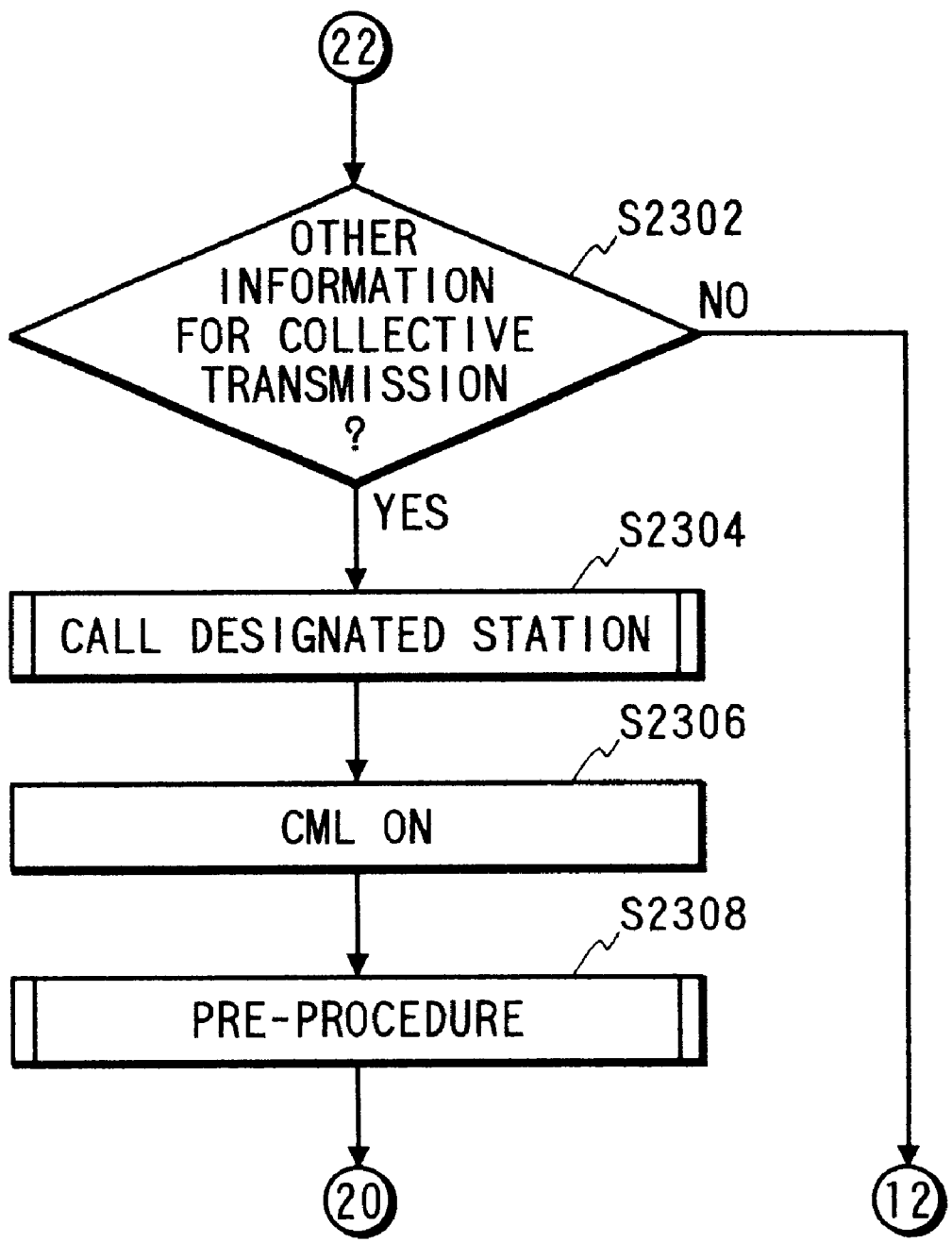
FIG. 35 is a flowchart showing operations of the eighth embodiment.
Figure 36:
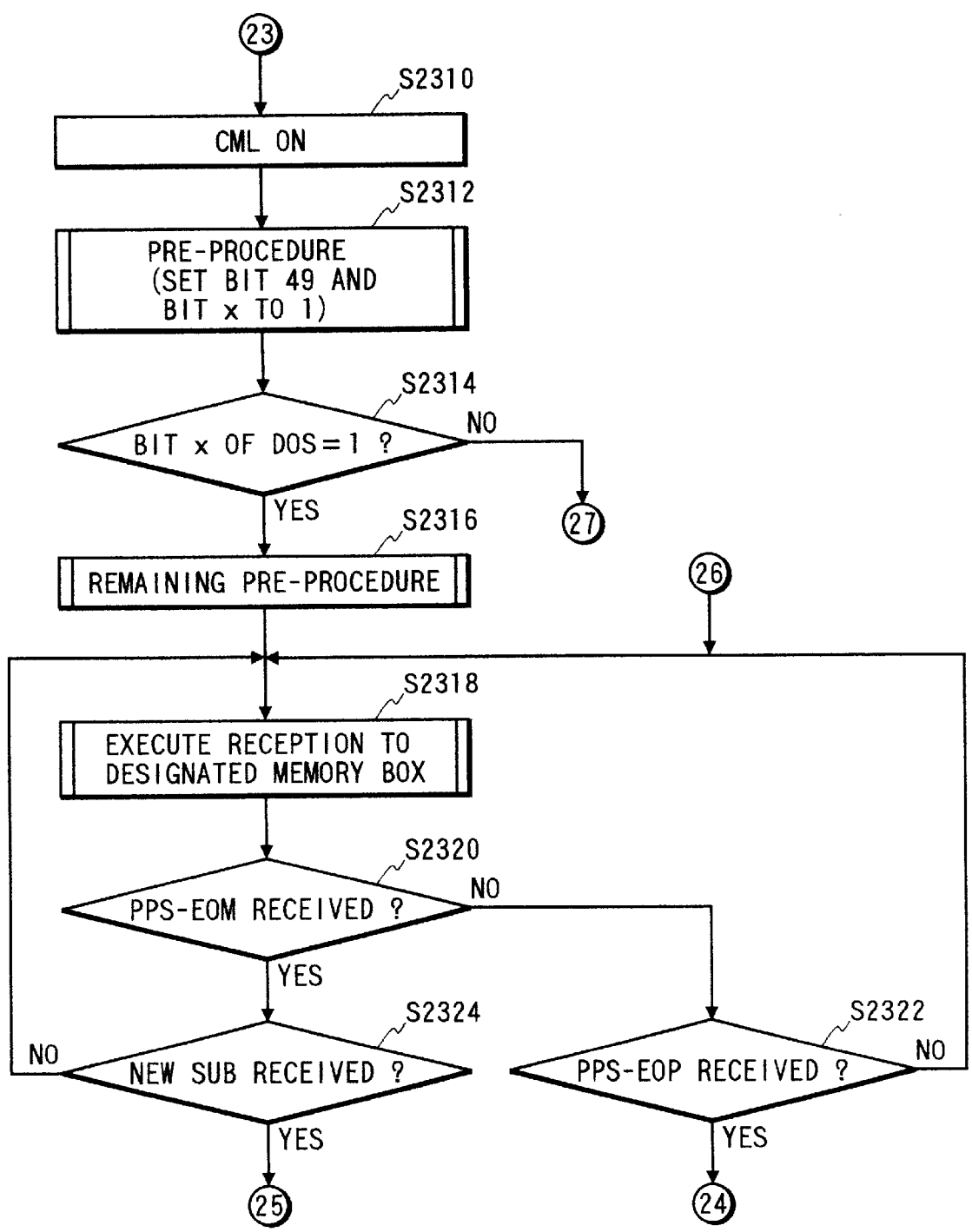
FIG. 36 is a flowchart showing operations of the eighth embodiment.
Figure 37:
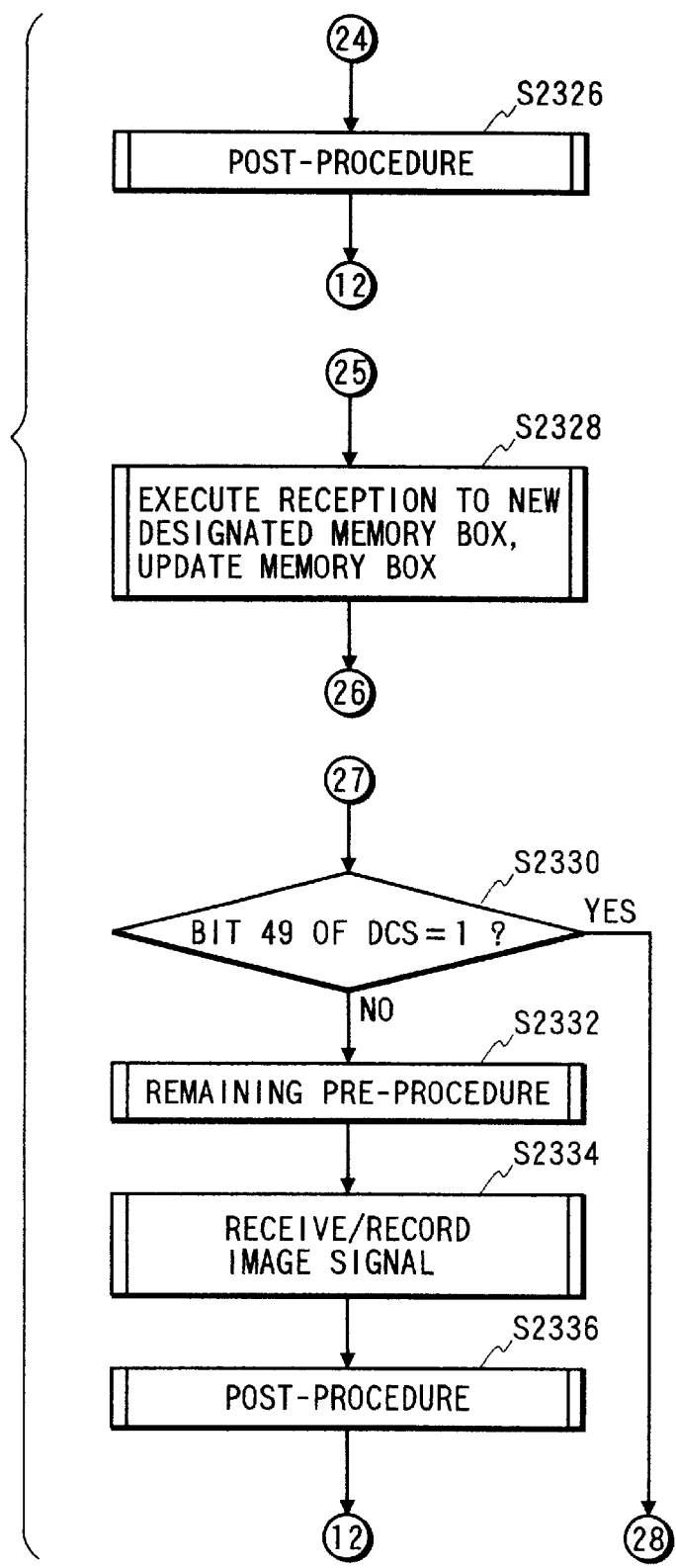
FIG. 37 is a flowchart showing operations of the eighth embodiment.
Figure 38:
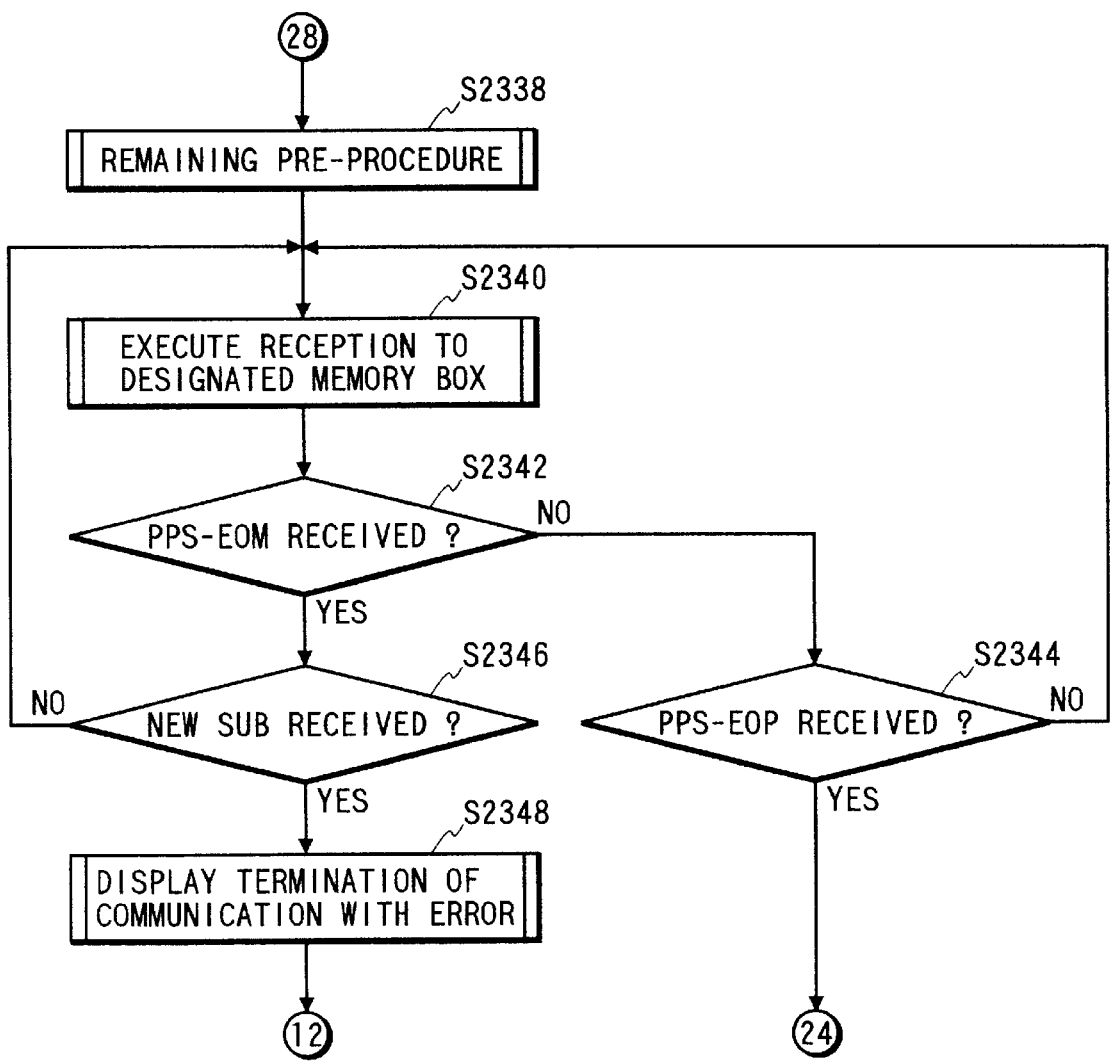
FIG. 38 is a flowchart showing operations of the eighth embodiment.

Referring to FIG. 28, control is started at step S2200. In step S2202, the control circuit 20 outputs a signal with signal level "0" to the signal line 20a to turn CML off. In step S2204, it outputs a signal with signal level "0" to the signal line 20d to disable send-out of the ANSam signal.

In step S2006, it takes in information of the signal line 24a to determine whether or not timer transmission has been selected. It proceeds to step S2208 if timer transmission has been selected, or to step S2212 if not.

In step S2208, the control circuit 20 performs input of a destination (station to be called) and a designated sub-address. In step S2210, it encodes the transmission information and stores it in the memory 18.

In step S2212, the control circuit 20 determines whether or not it is now the time for timer transmission. It proceeds to step S2218 if it is the time for timer transmission, or to step S2214 if not.

In step S2214, the control circuit 20 determines whether or not reception has been selected. It proceeds to step S2310 if reception has been selected, or to step S2216 if not to perform other processes and returns to step S2202.

In step S2218, the control circuit 20 calls the designated destination. In step S2220, it outputs a signal with signal level "1" to the signal line 20a to turn CML on.

Then, it performs pre-procedure in step S2222 and determines in step S2224 whether or not timer transmission of the sub-address is designated this time. It proceeds to step S2232 if timer transmission of the sub-address is designated, or to step S2226 if not.

In step S2226, the control circuit 20 performs remaining pre-procedure, where bit 49 and bit x of FIF of DCS signal are both set to 0. In step S2228, it transmits an image signal. Here, it executes collective transmission if possible. Then, it performs post-procedure in step S2230 and returns to step S2202.

In step S2232, the control circuit 20 determines whether or not there is information for collective transmission. It proceeds to step S2234 if there is information for collective transmission, or to step S2236 if not. In step S2234, the control circuit 20 determines whether or not the information for collective transmission is directed to the same sub-address. It proceeds to step S2236 if the information for collective transmission is directed to the same sub-address, or to step S2256 if not. In step S2236, it determines whether or not bit 49 of FIF of the DIS signal is 1. It proceeds to step S2238 if bit 49 of FIF of the DIS signal is 1, or to step S2254 if not.

In step S2238, the control circuit 20 performs pre-procedure and transmits SUB/DCS signal. Here, it set bit 49 of FIF of the DCS signal to 1 and bit x of FIF of the DCS signal to 0. In step S2240, it transmits inputted information (one text for timer transmission).

In step S2242, the control circuit 20 determines whether or not other information for collective transmission remains. It proceeds to step S2246 if other information for collective transmission remains, or step S2244 if not. In step S2244, it transmits PPS-EOP signal, receives MCF signal and transmits DCN signal. After that, it returns to step S2202.

In step S2246, the control circuit 20 determines whether or not mode change occurs. If mode change does not occur, it proceeds to step S2248 to transmit PPS-MPS signal and receive the MCF signal, and returns to step S2240. If mode change occurs, it proceeds to step S2250 to transmit PPS-EOM signal and receive MCF signal. Then, in step S2250, it transmits SUB/DCS signals. Here, it transmits the same SUB signal as the previous one and sets bit 49 of FIF of the DCS signal to 1 and bit x of FIF of the DCS signal to 0.

In step S2254, the control circuit 20 displays on the display unit 26 through the signal line 120f that a communication error has occurred because the partner station does not have the function of receiving the sub-address signal. This display is erased by any operator's key operation. Then, it returns to step S2202.

In step S2256, the control circuit 20 determines whether or not bit x of FIF of the DIS signal is 1. It proceeds to step S2258 if bit x of FIF of DIS is 1, or to step S2278 if bit x of FIF of DIS signal is 0.

In step S2258, the control circuit 20 performs pre-procedure. Here, it transmits SUB and the DCS signal designated by this sentence. In this case, bit 49 of FIF of the DCS signal and bit x of FIF of the DCS signal are both set to 1.

In step S2260, the control circuit 20 transmits inputted information (one information for timer transmission). In step S2262, it determines whether or not there is other information for timer transmission. It proceeds to step S2264 if there is other information for timer transmission, or to step S2278.

In step S2264, the control circuit 20 determines whether or not the current SUB signal is the same as the previous one. It proceeds to step S2266 if the current SUB signal is the same as the previous one, or to step S2274 if not.

In step S2266, the control circuit 20 determines whether or not mode change occurs. If occurs, it proceeds to step S2268 to transmit the PPS-MPS signal and receive the MCF signal. If not occur, it proceeds to step S2270 to transmit the PPS-EOM signal and receive the MCF signal.

In step S2272, the control circuit 20 transmits the same the SUB/DCS signals as the previous one. Here, bit 49 of FIF of the DCS signal and bit x of FIF of the DCS signal are both set to 1. Then, it returns to step S2260.

In step S2274, the control circuit 20 transmits the PPS-EOM signal and receives the MCF signal. In step S2276, it transmits the SUB and DCS signals designated by this sentence. In this case, bit 49 of FIF of the DCS signal and bit x of FIF of the DCS signal are both set to 1. Then, it returns to step S2260.

In step S2278, the control circuit 20 determines whether or not bit 49 of FIF of the DIS signal is 1. It returns to step S2254 if bit 49 of FIF of the DIS signal is 0, or proceeds to step S2280 if bit 49 of FIF of DIS signal is 1.

In step S2280, the control circuit 20 performs pre-procedure. Here, it transmits the SUB and the DCS signals designated by this sentence and sets bit 49 of FIF of the DCS signal to 1 and bit x of FIF of the DCS signal to 0.

Next, in step S2282, the control circuit 20 transmits inputted information (one information for timer transmission). In step S2284, it determines whether or not there is other information for timer transmission. It proceeds to step S2286 if there is other information for timer transmission, or to step S2288 if not. In step S2286, it determines whether or not there is information directed to the same SUB as the previous one. It proceeds to step S2292 if there is information directed to the same SUB as the previous one, or to step S2288 if not.

In step S2288, the control circuit 20 performs post-procedure. Here, it transmits the PPS-EOP signal and receives the MCF signal. Then, in step S2290, it outputs a signal with signal level "0" to the signal line 20a to turn CML off, and proceeds to step S2302.

In step S2292, the control circuit 20 sets current information to be directed to the same SUB as the previous one. In step S2294, it determines whether or not mode change occurs. If mode change does not occur, it proceeds to step S2296 to transmit the PPS-MPS signal and receive the MCF signal, and returns to step S2282. If mode change occurs, it proceeds to step S2298 to transmit the PPS-EOM signal and receive the MCF signal. Then, in step S2300, it transmits same SUB and the DCS signal as the previous ones. Here, it sets bit 49 of FIF of the DCS signal to 1 and bit x of FIF of the DCS signal to 0. After that, it returns to step S2282.

In step S2302, the control circuit 20 determines whether or not there is other information for collective transmission. It proceeds to step S2304 if there is other information for collective transmission, or returns to step S2202 if not. In step S2304, it calls the designated destination. In step S2306, it outputs a signal with signal level "1" to turn CML on. Then, it performs pre-procedure in step S2308 and returns to step S2278.

In step S2310, the control circuit 20 outputs a signal with signal level "1" to turn CML on. In step S2312, it performs pre-procedure. Here, bit 49 of FIF of the DIS signal and bit x of FIF of the DIS signal are both set to 1.

In step S2314, the control circuit 20 determines whether bit x of the DCS signal is 1 or 0. It proceeds to step S2330 if bit x of the DCS signal is 0 or to step S2316 if bit x of the DCS signal is 1. In step S2316, it performs remaining pre-procedure. Then, in step S2318, it executes reception to the designated memory box corresponding to the sub-addresses registered in the registration circuit 328. The information is received according to the specification of the memory box registered in the registration circuit 328.

In step S2320, the control circuit 20 determines whether or not the PPS-EOM signal has been received. It proceeds to step S2324 if the PPS-EOM signal has been received or to step S2322 if not. In step S2322, it determines whether or not the PPS-EOP signal has been received. If not received, it proceeds to step S2326 to perform post-procedure and returns to step S2202. If not received, it returns to step S2318.

In step S2324, the control circuit 20 determines whether or not a new sub-address signal has been received. It proceeds to step S2328 if a new sub-address signal has been received, or returns to step S2318 if not.

In step S2328, the control circuit 20 executes reception to a new designated memory box corresponding to the new sub-address registered in the registration circuit 328, and update the memory box. Here, the information is received according to the specification of the memory box registered in the registration circuit 328.

In step S2330, the control circuit 20 determines whether or not bit 49 of the DCS signal is 1. It proceeds to step S2338 if bit 49 of the DCS signal is 1 or to step S2332 if not.

In step S2332, the control circuit 20 performs remaining pre-procedure. Then, it executes reception/recording of an image signal in step S2334, performs post-procedure in step S2336, and returns to step S2202.

In step S2338, the control circuit 20 performs remaining pre-procedure. Then, in step S2340, it executes reception to the designated memory box corresponding to the sub-address registered in the registration circuit 328. Here, the information is received according to the specification of the memory box registered in the registration circuit 328.

In step S2342, the control circuit 20 determines whether or not the PPS-EOM signal has been received. It proceeds to step S2346 if the PPS-EOM signal has been received, or to step S2344 if not. In step S2344, it determines whether or not PPS-EOP has been received. It returns to step S2326 if the PPS-EOP signal has been received or to step S2340 if not.

In step S2346, the control circuit 20 determines whether or not a new sub-address signal has been received. It returns to step S2340 if the received sub-address is not new one, or proceeds to step S2348 if the received sub-address is new one. In step S2348, it terminates communication and displays termination of communication with error. Then, it returns to step S2202.

Ninth Embodiment

A ninth embodiment will next be described.

In the ninth embodiment, when the facsimile apparatus that is notified by the DCS signal of transmitting a sub-address in the eighth embodiment has received plural sub-addresses, the control circuit 20 enables the plural sub-addresses and executes reception processing.

Figure 39:
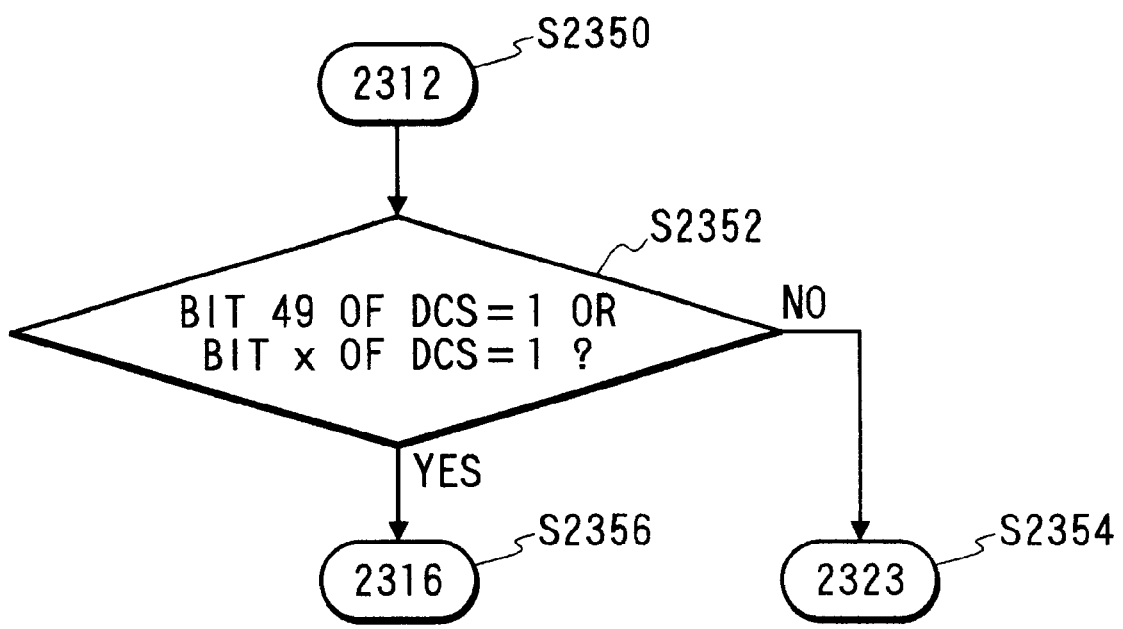
FIG. 39 is a flowchart showing an operation in the ninth embodiment.

FIG. 39 is a flowchart showing portion of control operations of the control circuit 20 in the ninth embodiment different from the eighth embodiment.

Referring to FIG. 39, step S2350 represents step S2312 described above. Then, in step S2352, the control circuit 20 determines whether or not either bit 49 or bit x of the DCS signal is 1. It proceeds to step S2356 (corresponding to step S2316) if YES or to step S2354 (corresponding to step S2332) if NO.

Although the above embodiments were described with respect to facsimile communication according to the ITU-T recommendations V.8 or V.34, the present invention is not limited thereby and other several communication apparatuses such as to operate according to a communication protocol having functions similar to the recommendations are also applicable.

Also, the above embodiments were described by taking a stand-alone facsimile apparatus by way of example, but the present invention is not limited thereby and such facsimile capability can be used for data communication control in an integrated data processing system that combines copying capability and electronic file capability, and further data processing capability and communication capability.

As described above, according to the sixth to ninth embodiments, when a user on the send station side intends to use a sub-address signal for confidential communication via a memory box or routing, the user inputs how to use the sub-address signal and a password so as to notify the partner receive station of the information. For this, the user on the send station can obtain information on how to use the sub-address signal designated by the receive station and make a display of it. It is therefore unnecessary for the operator on the send station side to wait for a telephone call from the operator on the receive station side. This makes it possible for both operators to im prove working efficiency.

Also, according to seventh embodiment, even when plural members share the communication apparatus, each individual can register a mem ory box or th e way of routing corresponding to how the individual uses the sub-address, thus providing a convenient apparatus.

Further, according to the eighth and ninth embodiments, the receive station can notify the partner station of presence or absence of the function of receiving plural sub-address signals during one communication, i.e., it can clearly notify the partner station of the function of receiving sub-address signals. This avoids any communication error due to transmission of plural sub-address signals during one communication, thereby improving working efficiency.

Furthermore, according to the eighth and ninth embodiments, when plural texts designated by different sub-address signals are transmitted at a time through collective transmission directed to the same station, no communication error occurs and adequate communication is realized in a short period of time because such collective transmission is limited by the performance of the partner receive station.

Furthermore, according to the eighth embodiment, the receive station can recognize in the pre-procedure at the time of starting communication whether or not plural sub-address signals are transmitted during one communication, thereby making it easy to control the receiving process.

Furthermore, according to the ninth embodiment, even when plural sub-address signals have actually been transmitted during one communication without any notification of it from the send station, the receive station enables these sub-address signals, thus giving the apparatus flexibility.

What is claimed is:

1. A communication apparatus comprising:

detection means for detecting a partner station and presence or absence of a function of plural selective pollings;

request means for always requesting the partner station to execute communication for plural selective pollings when a partner polling send station has the function of plural selective pollings; and plural selective polling means that during one connection of a communication line to the same partner station, a polling receive station sends plural selective polling request signals to the send station, and the send station sends plural images to the receive station in response to the plural selective polling request signals, wherein designation of other communication for plural selective pollings is permitted while the polling receive station executes the current communication.

2. A communication apparatus according to claim 1, wherein the communication for plural selective pollings is executed during one communication when communication for plural selective pollings has been selected by the polling receive station and the partner polling send station has the function of plural selective pollings, or the call is released each time communication of one selective polling is completed and the same station is automatically called for the next selective polling when communication for plural selective pollings has been selected by the polling receive station and the partner polling send station does not have the function of plural selective pollings.

3. A communication apparatus according to claim 2, wherein the polling receive station automatically calls the same station for the number of designated selective pollings when the partner polling send station does not have the function of plural selective pollings.

4. A communication apparatus comprising:

registration means for registering information as to whether or not communication for plural selective pollings is possible at each calling destination; and plural selective polling means that during one connection of a communication line to a partner station, a receive station sends plural selective polling request signals to a send station, and the send station sends plural images to the receive station in response to the plural selective polling request signals, wherein when a calling destination is designated after selecting plural selective pollings, the polling receive station dials the calling destination if it is determined that communication for plural selective pollings is possible at the calling destination from the information registered in said registration means, or makes a display that communication for plural selective pollings is impossible without dialing the calling destination if it is determined that communication for plural selective pollings is impossible at the calling destination.

5. A communication apparatus according to claim 4, wherein if it is determined that communication for plural selective pollings is impossible at the destination, the polling receive station makes a display of plural selective pollings inputted by the operator in addition to the display that communication for plural selective pollings is impossible so that the operator can select one of plural selective pollings and designate start of polling reception for having the polling receive station to dial the calling destination.

6. A communication apparatus according to claim 4, wherein the registered information as to whether or not communication for plural selective pollings is possible at each calling destination is updated each time an initial identification signal is received at the time of communication.

7. A communication apparatus comprising:
registration means for registering information as to whether or not communication for plural selective pollings is possible at each calling destination; and
plural selective polling means that during one connection of a communication line to a partner station, a receive station sends plural selective polling request signals to a send station, and the send station sends plural images to the receive station in response to the plural selective polling request signals,
wherein when communication for plural selective pollings is selected after calling, the polling receive station determines whether or not communication for plural selective pollings is possible based on the information registered in said registration means before receiving an initial identification signal, and it determines whether or not communication for plural selective pollings is possible based on an initial identification signal after receiving the initial identification signal, and
the polling receive station executes plural selective pollings in a communication event if it is determined that communication for plural selective pollings is possible, or it disables the second and subsequent selective pollings and makes a display of it if it is determined that communication for plural selective pollings is impossible.

8. A communication apparatus according to claim 7, wherein the registered information as to whether or not communication for plural selective pollings is possible at each calling destination is updated each time an initial identification signal is received at the time of communication.

9. A control method for a communication apparatus comprising the steps of:
registering information as to whether or not communication for plural selective pollings is possible at each calling destination; and
sending plural selective polling request signals from a receive station to a send station and sending plural images from the send station to the receive station in response to the plural selective polling request signals, during one connection of a communication line to a partner station;
wherein when a calling destination is designated after selecting plural selective pollings, the polling receive station dials the calling destination if it is determined that communication for plural selective pollings is possible at the calling destination from the information registered in said registration means, or makes a display that communication for plural selective pollings is impossible without dialing the calling destination if it is determined that communication for plural selective pollings is impossible at the calling destination.

10. A communication apparatus comprising:
a means for executing plural selecting pollings;
a means for receiving a notification of whether or not a partner station has a function of plural selective pollings to be sent from a polling send station to a polling receive station;
a means for notifying the partner polling send station of whether or not the polling receive station requests plural selecting pollings;
a means for setting and executing timer polling reception;
a means for changing, between a timer polling reception mode and a real-time polling reception mode, the contents of the notification of whether or not the polling receive stations requests plural selecting pollings; and
plural selective polling means that during one connection of a communication line to the same partner station, the receive station sends plural selective polling request signals to the send station, and the send station sends plural images to the receive station in response to the plural selective polling request signals,
wherein the polling receive station requests the polling send station to transmit plural selective pollings in the real-time polling reception mode both when selecting communication of one selective polling and when selecting communication of plural selective pollings.

11. A communication apparatus according to claim 10, wherein the polling receive station does not request the polling send station to transmit plural selective pollings when selecting communication of one selective polling in the timer polling reception mode, or it requests the polling send station to transmit plural selective pollings when selecting communication of plural selective pollings in the timer polling reception mode.

12. A communication method comprising the steps of:
detecting a partner station and presence or absence of a function of plural selective pollings;
requesting the partner station to execute communication for plural selective pollings when a partner polling send station has the function of plural selective pollings; and
plural selective polling such that during one connection of a communication line to the same partner station, a polling receive station sends plural selective polling request signals to the send station, and the send station sends plural images to the receive station in response to the plural selective polling request signals,
wherein designation of other communication for plural selective pollings is permitted while the polling receive station executes the current communication.

13. A communication method according to claim 12, wherein
the communication for plural selective pollings is executed during one communication when communication for plural selective pollings has been selected by the polling receive station and the partner polling send station has the function of plural selective pollings, or
the call is released each time communication of one selective polling is completed and the same station is automatically called for the next selective polling when communication for plural selective pollings has been selected by the polling receive station and the partner polling send station does not have the function of plural selective pollings.

14. A communication method according to claim 13, wherein the polling receive station automatically calls the same station for the number of designated selective pollings when the partner polling send station does not have the function of plural selective pollings.

15. A communication method comprising:

a registration step for registering information as to whether or not communication for plural selective pollings is possible at each calling destination; and a plural selective polling step that during one connection of a communication line to a partner station, a receive station sends plural selective polling request signals to a send station, and the send station sends plural images to the receive station in response to the plural selective polling request signals, wherein when communication for plural selective pollings is selected after calling, the polling receive station determines whether or not communication for plural selective pollings is possible based on the information registered in the registration step before receiving an initial identification signal, and it determines whether or not communication for plural selective pollings is possible based on an initial identification signal after receiving the initial identification signal, and the polling receive station executes plural selective pollings in a communication event if it is determined that communication for plural selective pollings is possible, or it disables the second and subsequent selective pollings and makes a display of it if it is determined that communication for plural selective pollings is impossible.

16. A communication method comprising the steps of:

executing plural selecting pollings;

receiving a notification of whether or not a partner station has a function of plural selective pollings to be sent from a polling send station to a polling receive station;

notifying the partner polling send station of whether or not the polling receive station requests plural selecting pollings;

setting and executing timer polling reception;

changing, between a timer polling reception mode and a real-time polling reception mode, the contents of the notification of whether or not the polling receive stations requests plural selecting pollings; and plural selective polling such that during one connection of a communication line to the same partner station, the receive station sends plural selective polling request signals to the send station, and the send station sends plural images to the receive station in response to the plural selective polling request signals, wherein the polling receive station requests the polling send station to transmit plural selective pollings in the real-time polling reception mode both when selecting communication of one selective polling and when selecting communication of plural selective pollings.

17. A communication method according to claim 16, wherein the polling receive station does not request the polling send station to transmit plural selective pollings when selecting communication of one selective polling in the timer polling reception mode, or if requests the polling send station to transmit plural selective pollings when selecting communication of plural selective pollings in the timer polling reception mode.

* * * * *

UNITED STATES PATENT AND TRADEMARK OFFICE
CERTIFICATE OF CORRECTION

PATENT NO.    : 6,281,987 B1
DATED         : August 28, 2001
INVENTOR(S)   : Takehiro Yoshida It is certified that error appears in the above-identified patent and that said Letters Patent is hereby corrected as shown below:

Column 1,
Line 47, "time very much." should read -- very much time. --.

Column 4,
Line 44, "has" should read -- have --.

Column 10,
Line 37, "has" should read -- have --.

Column 21,
Line 43, "im prove" should read -- improve --.
Line 46, "mem ory" should read -- memory --.
Line 46, "th e" should read -- the --.

Signed and Sealed this

Twenty-fourth Day of June, 2003

JAMES E. ROGAN
*Director of the United States Patent and Trademark Office*